United States Patent [19]

Fletcher et al.

[11] 4,442,487

[45] Apr. 10, 1984

[54] THREE LEVEL MEMORY HIERARCHY USING WRITE AND SHARE FLAGS

[75] Inventors: Robert P. Fletcher, Poughkeepsie; David M. Stein, Pleasantville; Irving Wladawsky-Berger, New York, all of N.Y.

[73] Assignee: International Business Machines Corporation, Armonk, N.Y.

[21] Appl. No.: 336,521

[22] Filed: Dec. 31, 1981

[51] Int. Cl.³ ............................................. G06F 13/00
[52] U.S. Cl. ................................................... 364/200
[58] Field of Search .............................. 364/200, 900

[56] References Cited

U.S. PATENT DOCUMENTS

| | | | |
|---|---|---|---|
| 3,581,291 | 5/1971 | Iwamoto et al. | 364/200 |
| 3,685,020 | 8/1972 | Meade | 364/200 |
| 3,735,360 | 5/1973 | Anderson et al. | 364/200 |
| 3,845,474 | 10/1974 | Lange et al. | 364/200 |
| 3,848,234 | 11/1974 | MacDonald | 364/200 |
| 4,020,466 | 4/1977 | Cordi et al. | 364/200 |
| 4,056,845 | 11/1977 | Churchill, Jr. | 364/200 |
| 4,096,567 | 6/1978 | Millard et al. | 364/200 |
| 4,136,386 | 1/1979 | Annunziata et al. | 364/200 |
| 4,141,067 | 2/1979 | McLagan | 364/200 |
| 4,144,566 | 3/1979 | Timsit | 364/200 |
| 4,228,503 | 10/1980 | Waite et al. | 364/200 |

OTHER PUBLICATIONS

IBM Technical Disclosure Bulletin, vol. 21, No. 6 Nov. 1978, pp. 2468-2469 F. J. Sparacio "Data Processing System with Second Level Cache".

Primary Examiner—Jerry Smith
Assistant Examiner—Jameson Lee
Attorney, Agent, or Firm—Jack M. Arnold

[57] ABSTRACT

A multiprocessing three level memory hierarchy implementation is described which uses a "write" flag and a "share" flag per page of information stored in a level three main memory. These two flag bits are utilized to communicate from main memory at level three to private and shared caches at memory levels one and two how a given page of information is to be used. Essentially, pages which can be both written and shared are moved from main memory to the shared level two cache and then to the shared level one cache, with the processors executing from the shared level one cache. All other pages are moved from main memory to the private level two and level one caches of the requesting processor. Thus, a processor executes either from its private or shared level one cache. This allows several processors to share a level three common main memory without encountering cross interrogation overhead.

10 Claims, 28 Drawing Figures

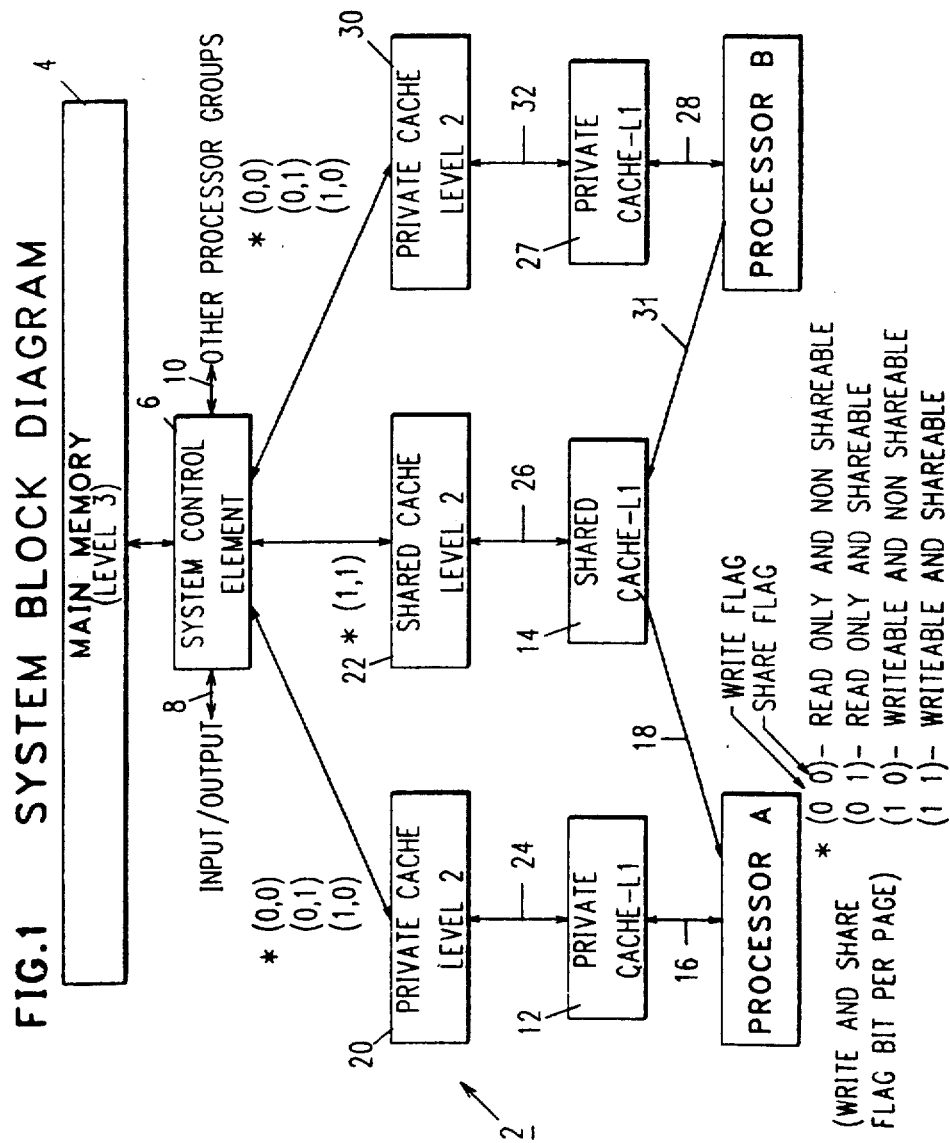

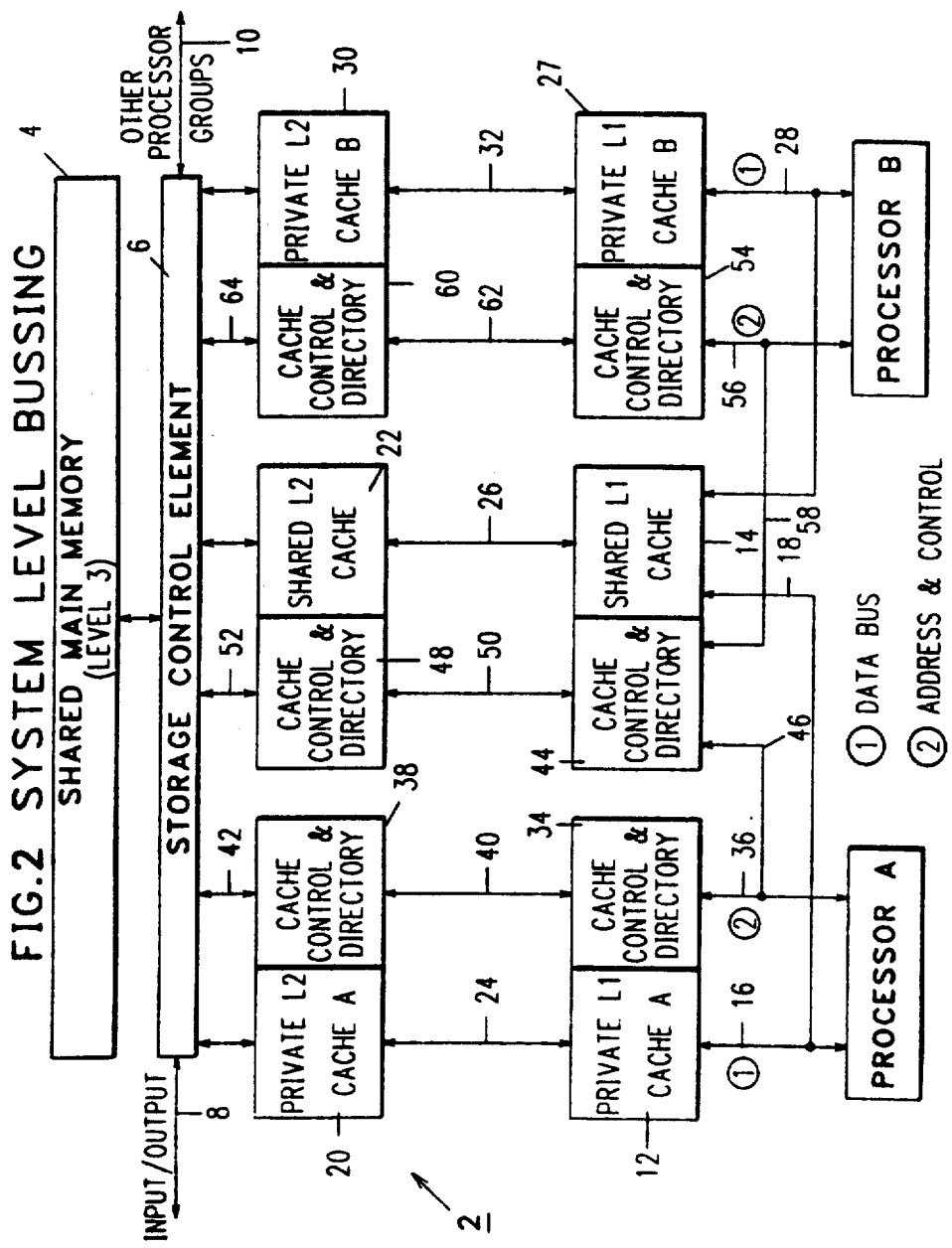
FIG.2 SYSTEM LEVEL BUSSING

| WRITE BIT | SHARE BIT | | XI |
|---|---|---|---|
| 0 | 0 | SINGLE COPY IN ONE PRIVATE L2 & L1 CACHE | NO |
| 0 | 1 | COPY IN MULTIPLE PRIVATE L2 & L1 CACHES POSSIBLE | NO |
| 1 | 0 | SINGLE COPY IN ONE PRIVATE L2 & L1 CACHE | NO |
| 1 | 1 | SINGLE COPY IN ONE SHARED L2 & L1 CACHE | * NO |

"XI" INDICATES CROSS INTERROGATION OF OTHER SHARED CACHES IN OTHER GROUPS ON A MISS

* IF MORE THAN ONE PROCESSOR GROUP, THAT IS, MULTIPLE SHARED CACHES, THEN XI IS REQUIRED BETWEEN SHARED CACHES.

FIG.3
WRITE AND SHARE CONTROL CHART

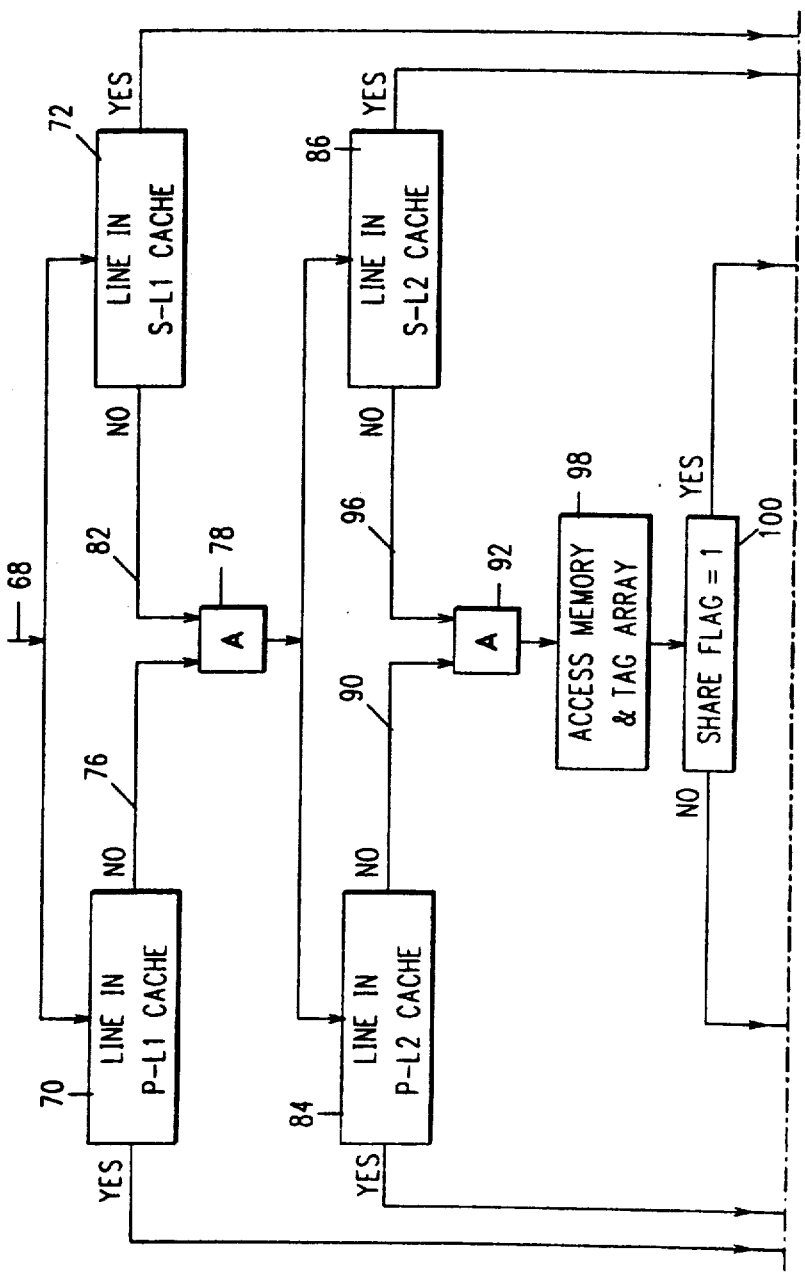
FIG. 4.1 PROCESSOR MEMORY "FETCH REQUEST"

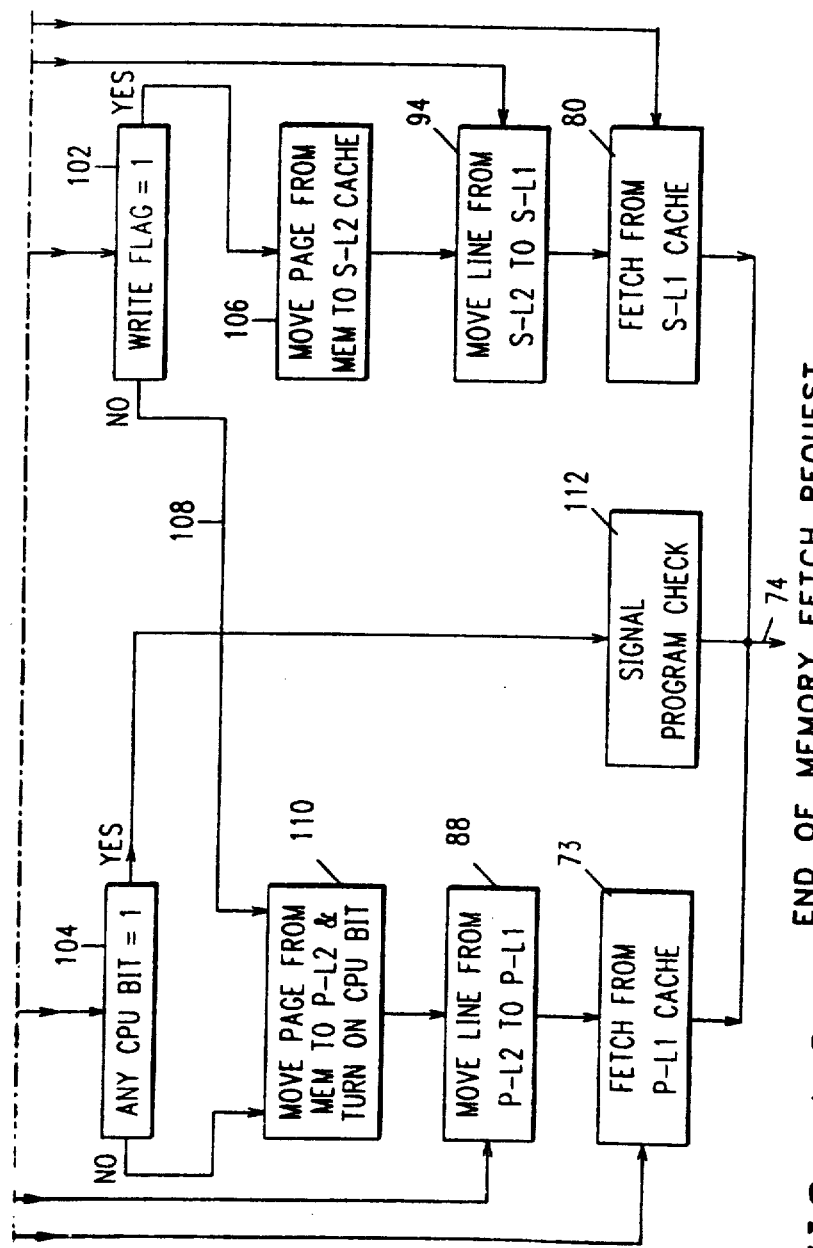
FIG. 4.2

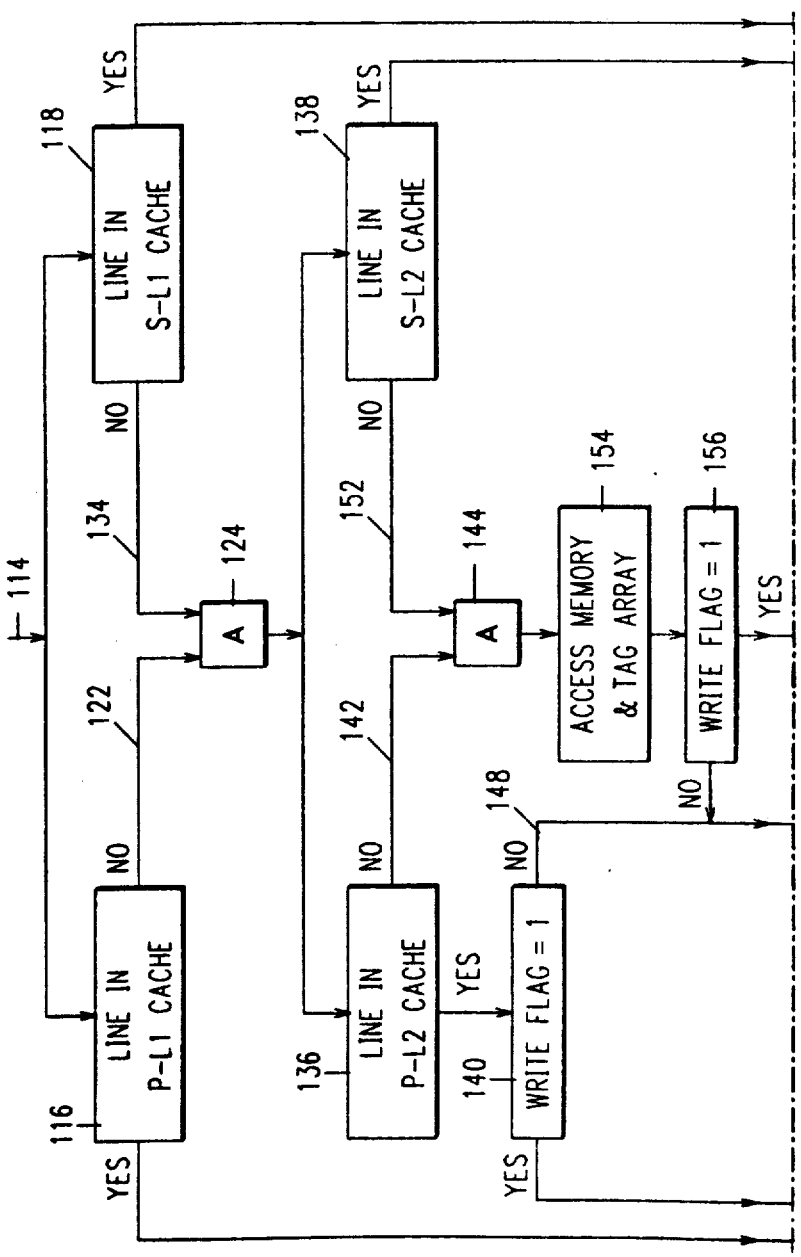
FIG. 5.1 PROCESSOR MEMORY "STORE REQUEST"

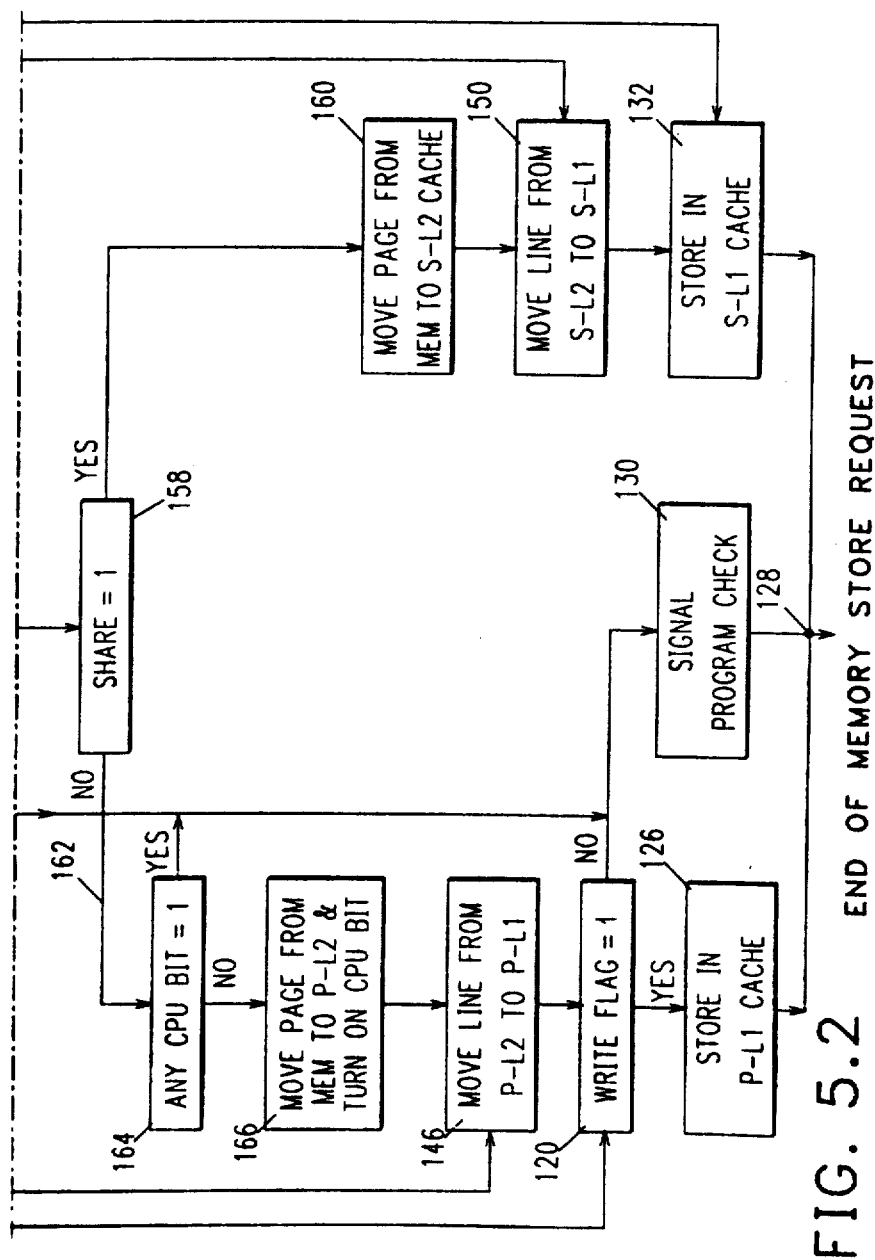
FIG. 5.2

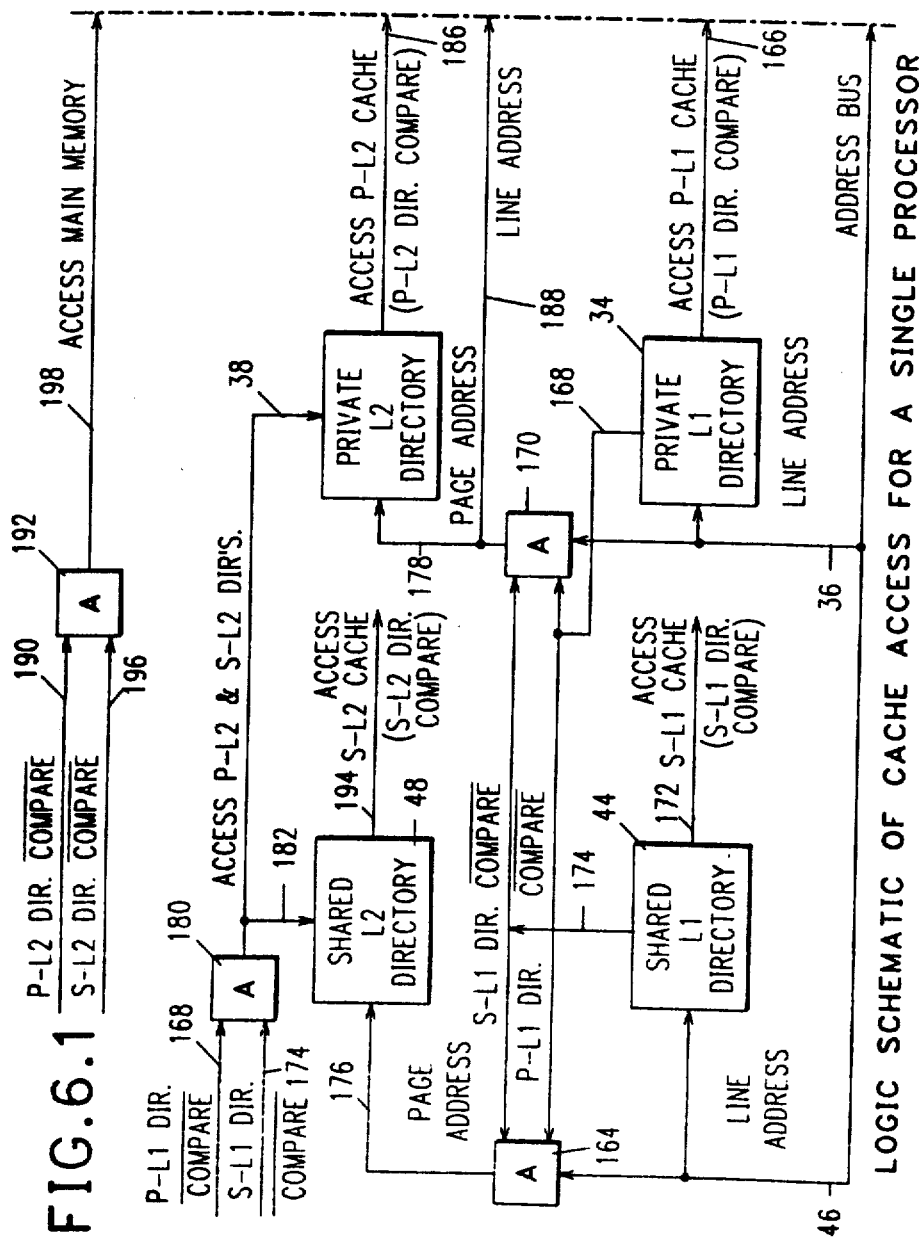

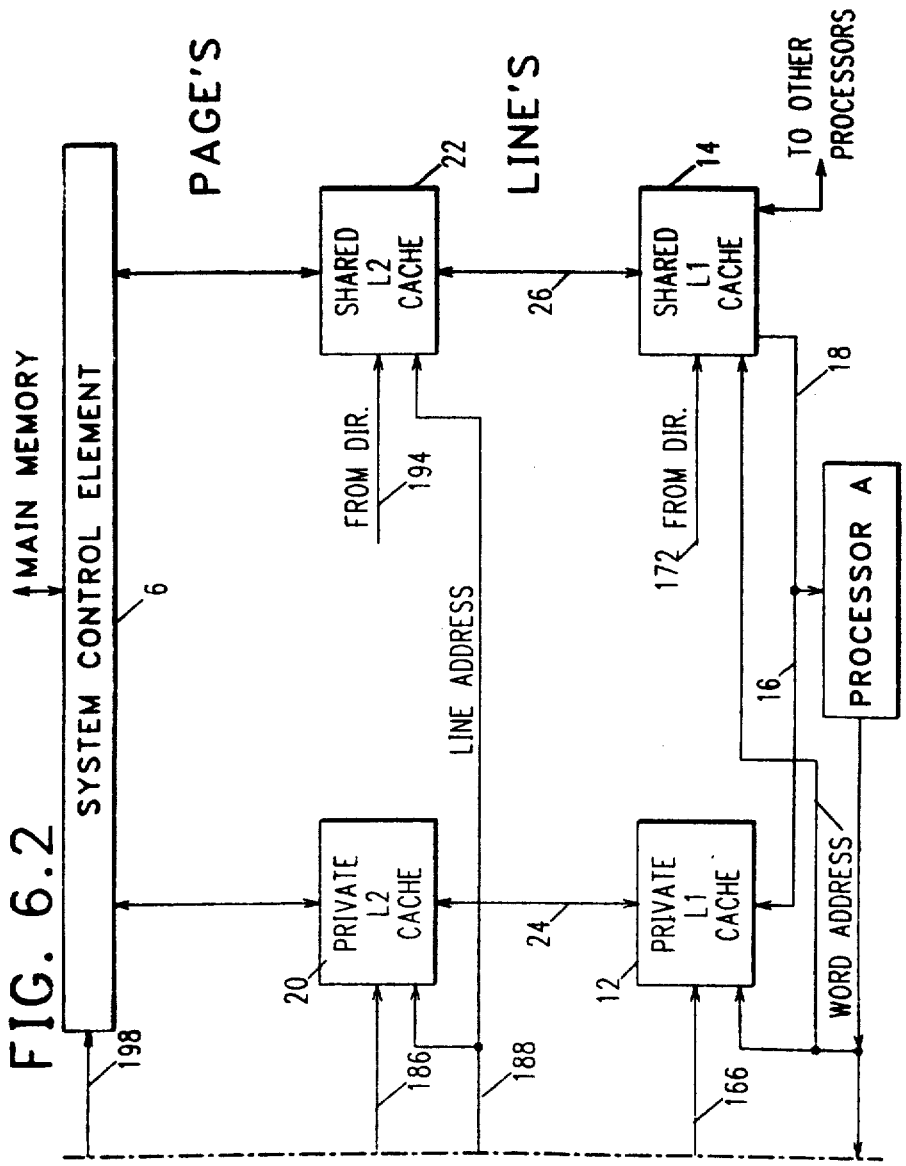
FIG. 6.2

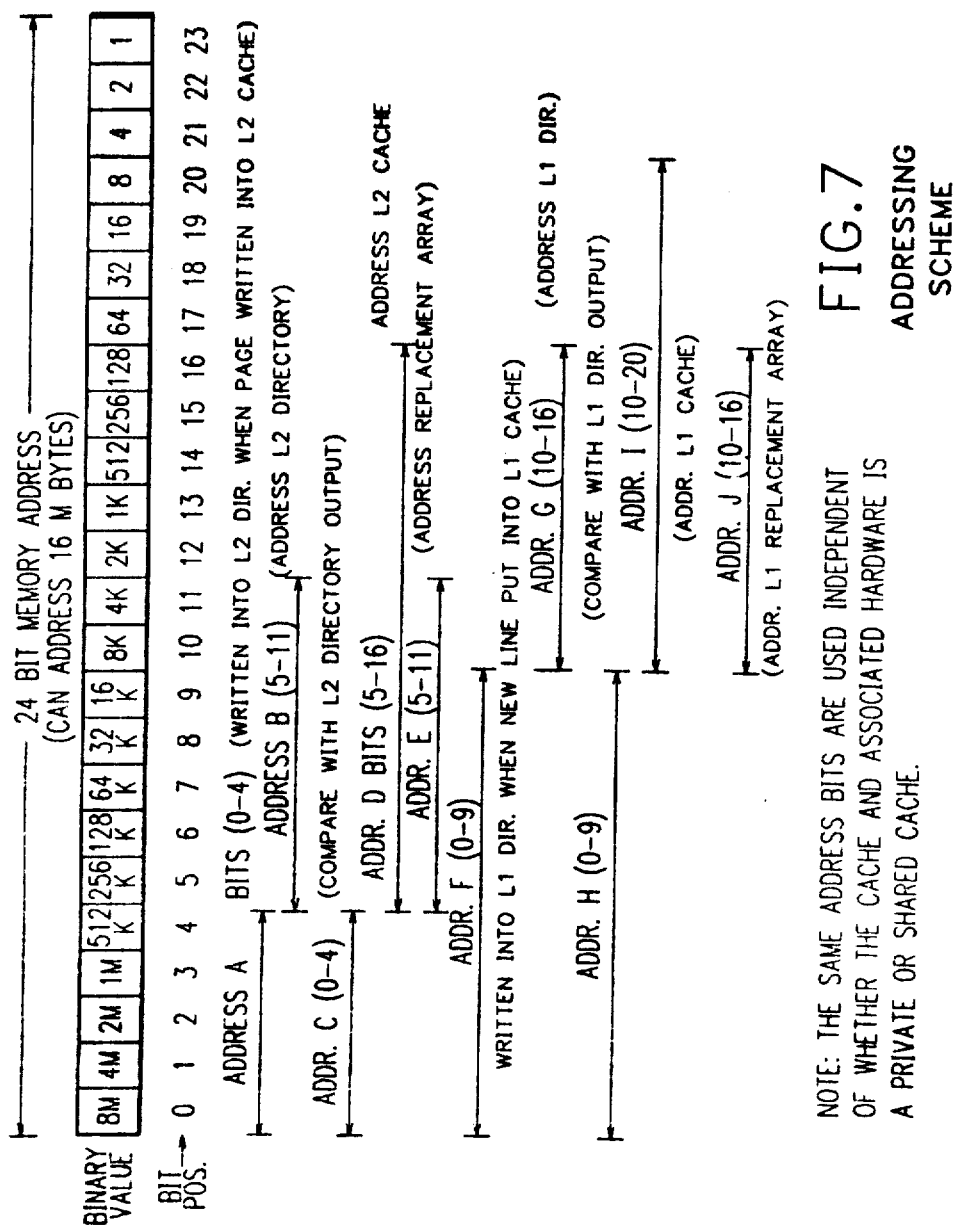

PRIVATE L1 DIRECTORY REG.

SHARED LEVEL 1 DIRECTORY REG.

PRIVATE L2 DIRECTORY REG.

SHARED LEVEL 2 DIRECTORY REG.

WRITE AND SHARE FLAG CONTROL LOGIC

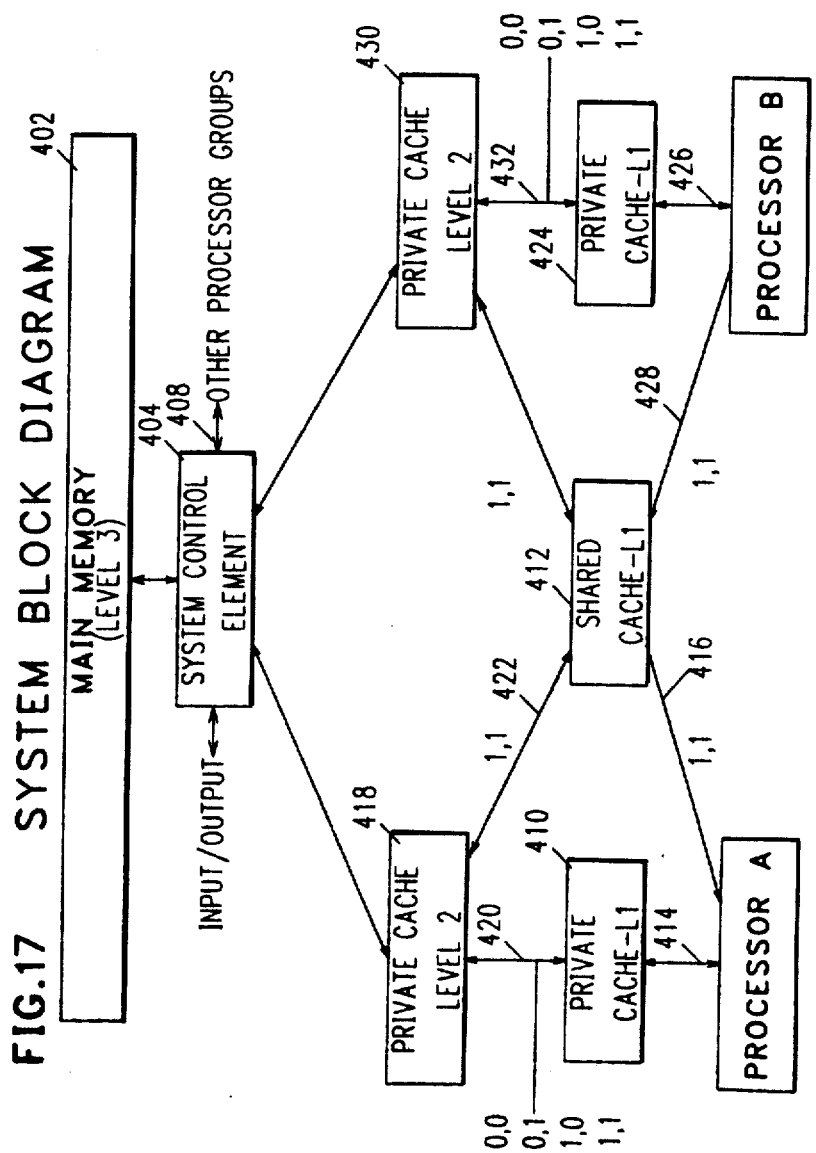
FIG. 17 SYSTEM BLOCK DIAGRAM

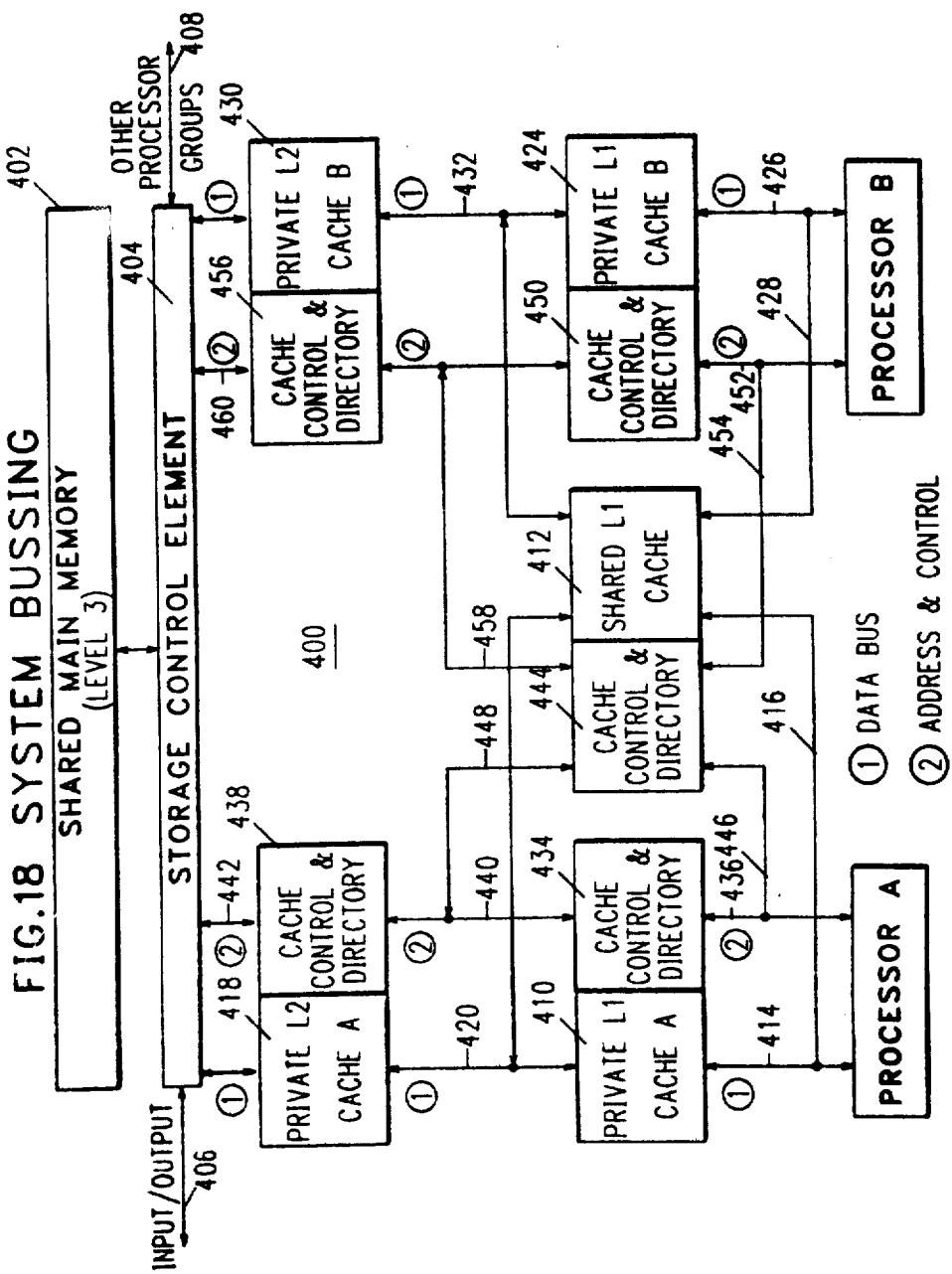

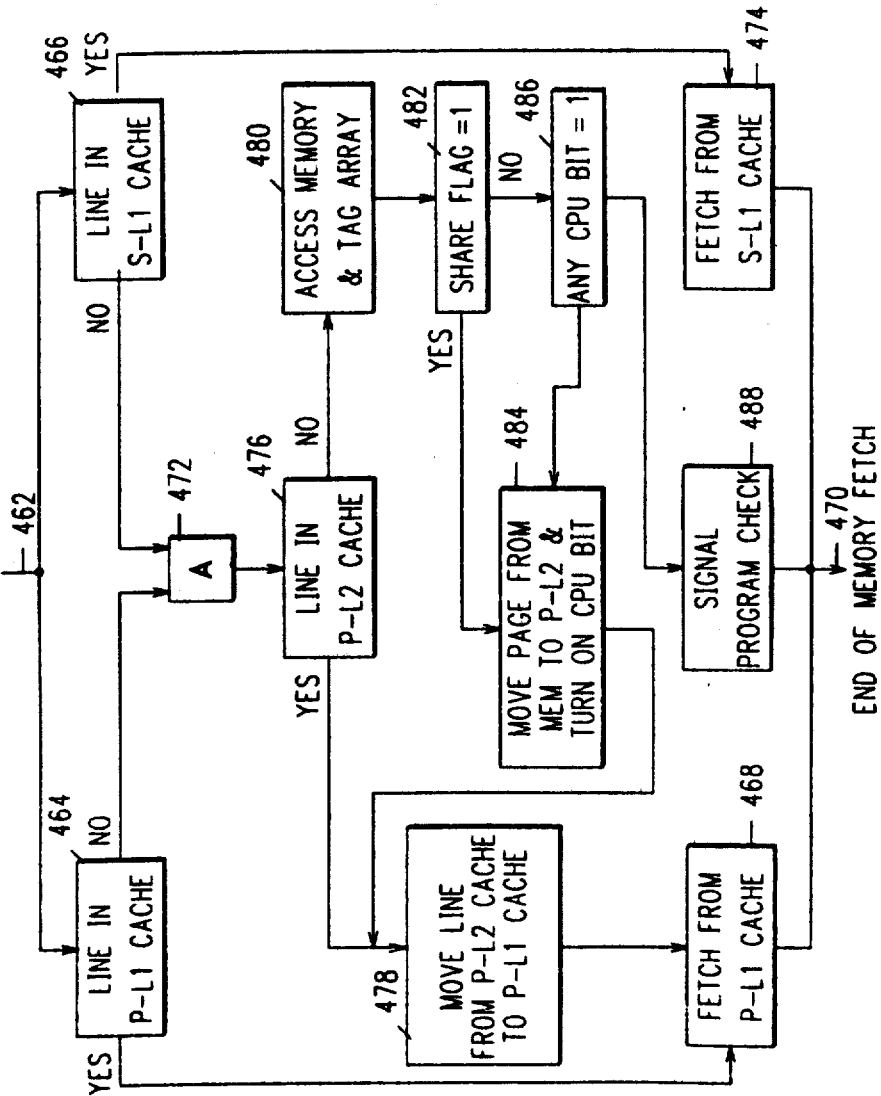
FIG. 19 PROCESSOR MEMORY "FETCH" REQUEST

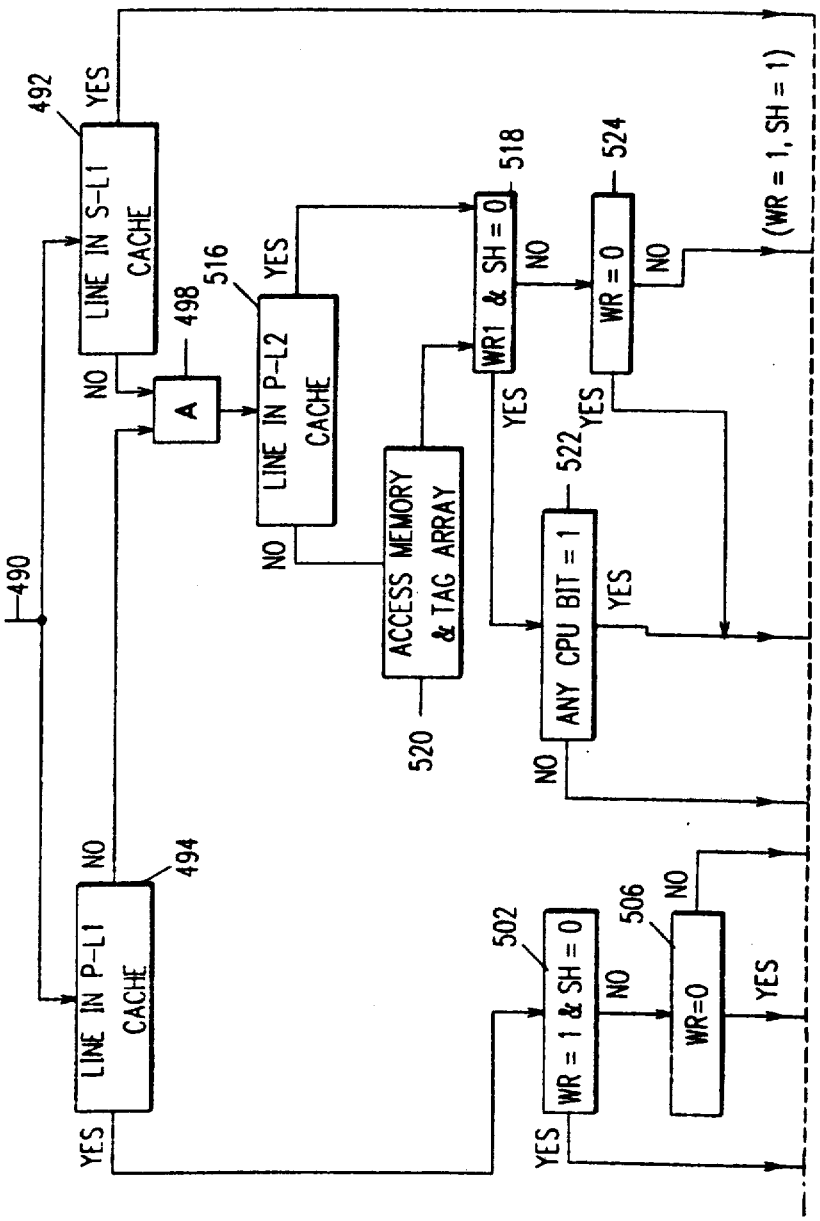
FIG. 20.1 STORE REQUEST FLOW CHART

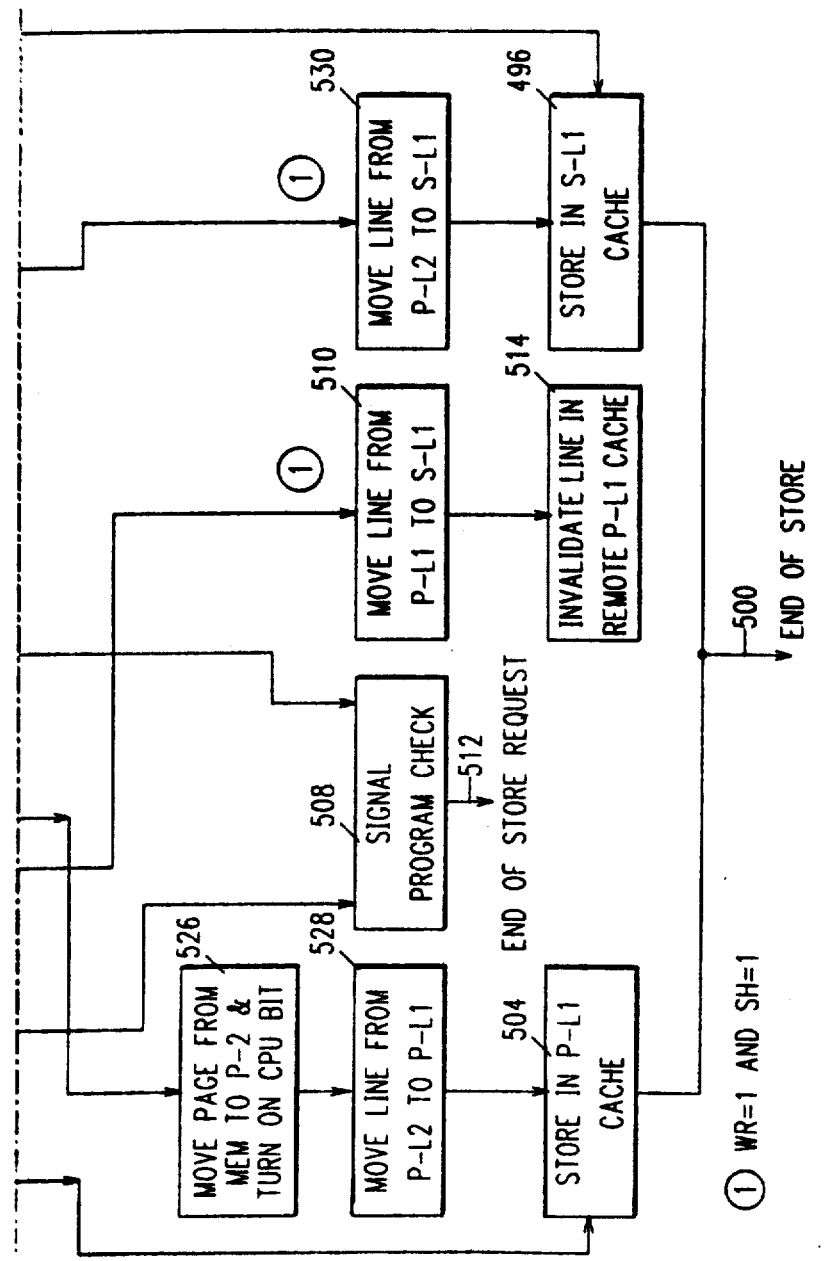

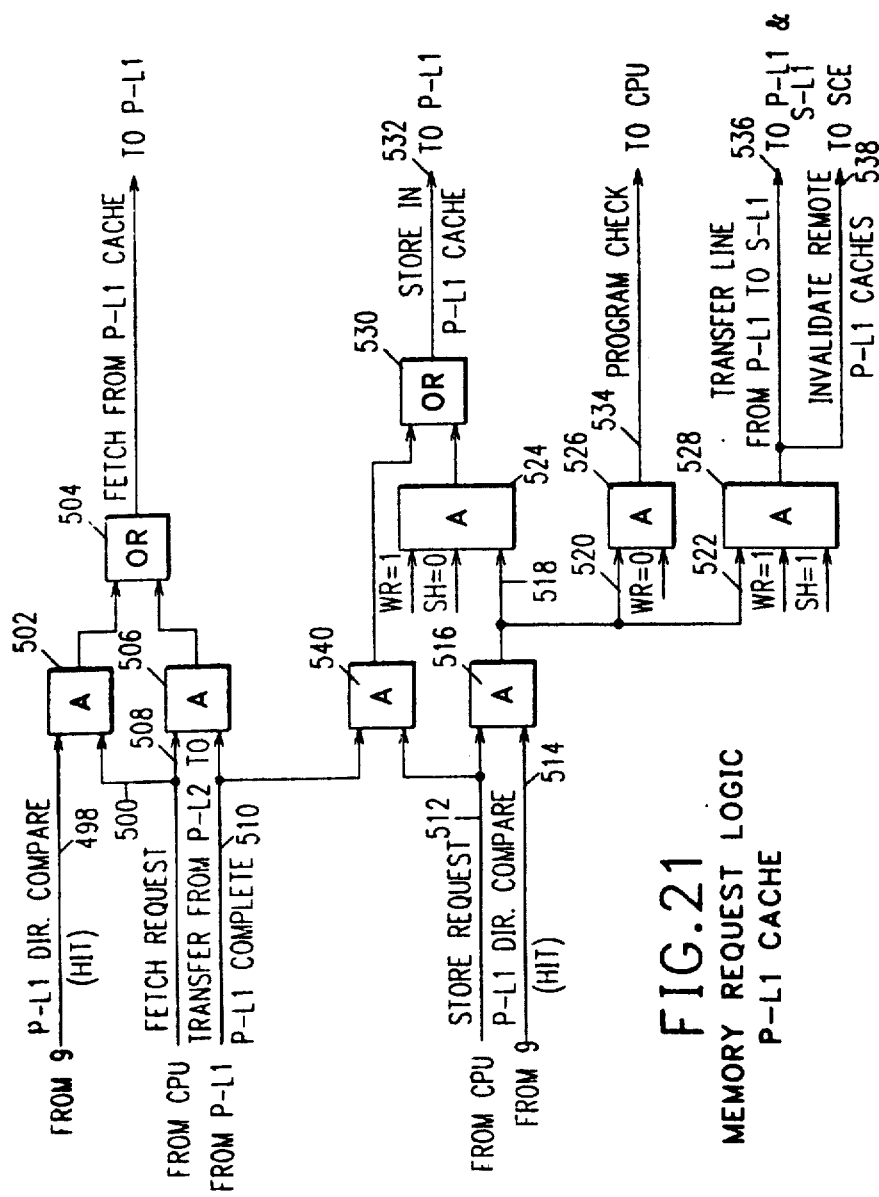
FIG.21 MEMORY REQUEST LOGIC P-L1 CACHE

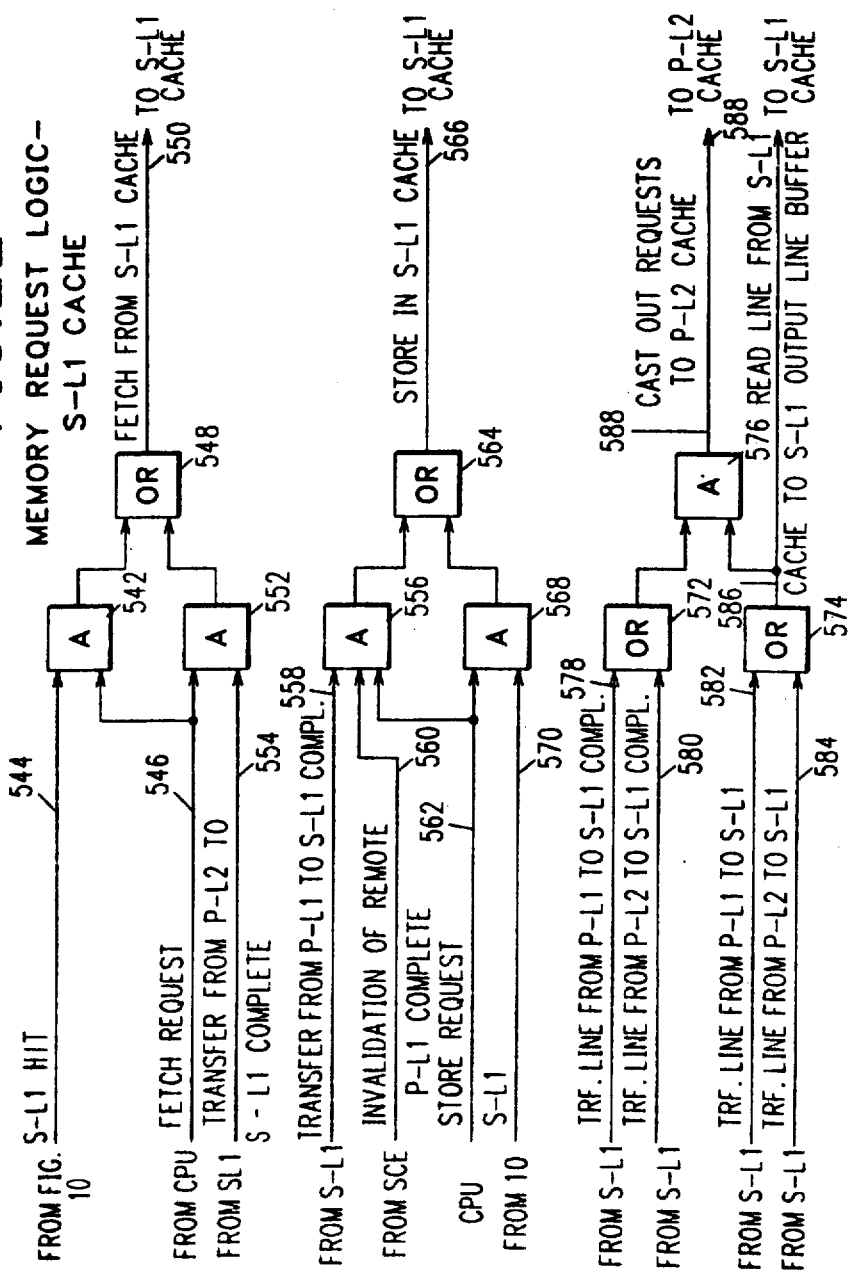

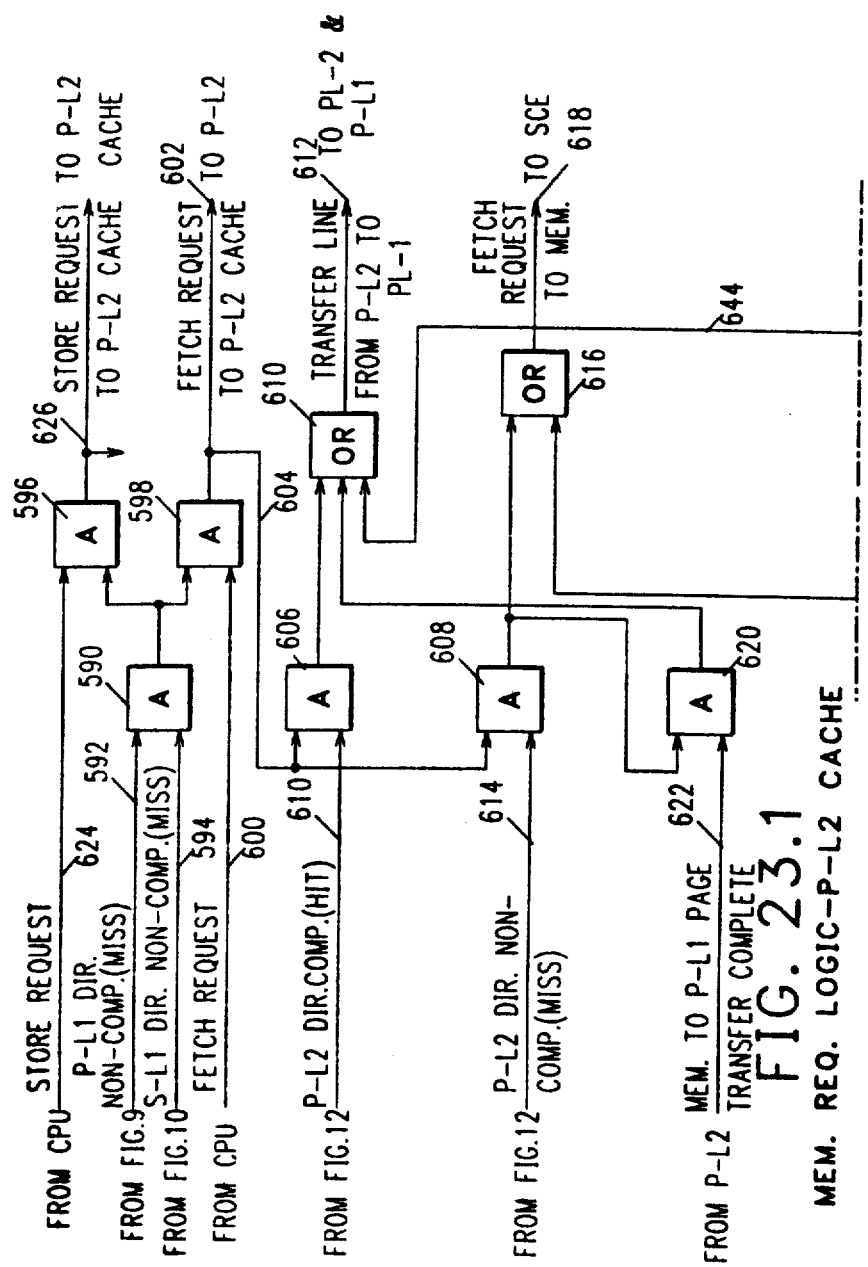
FIG. 23.1 MEM. REQ. LOGIC-P-L2 CACHE

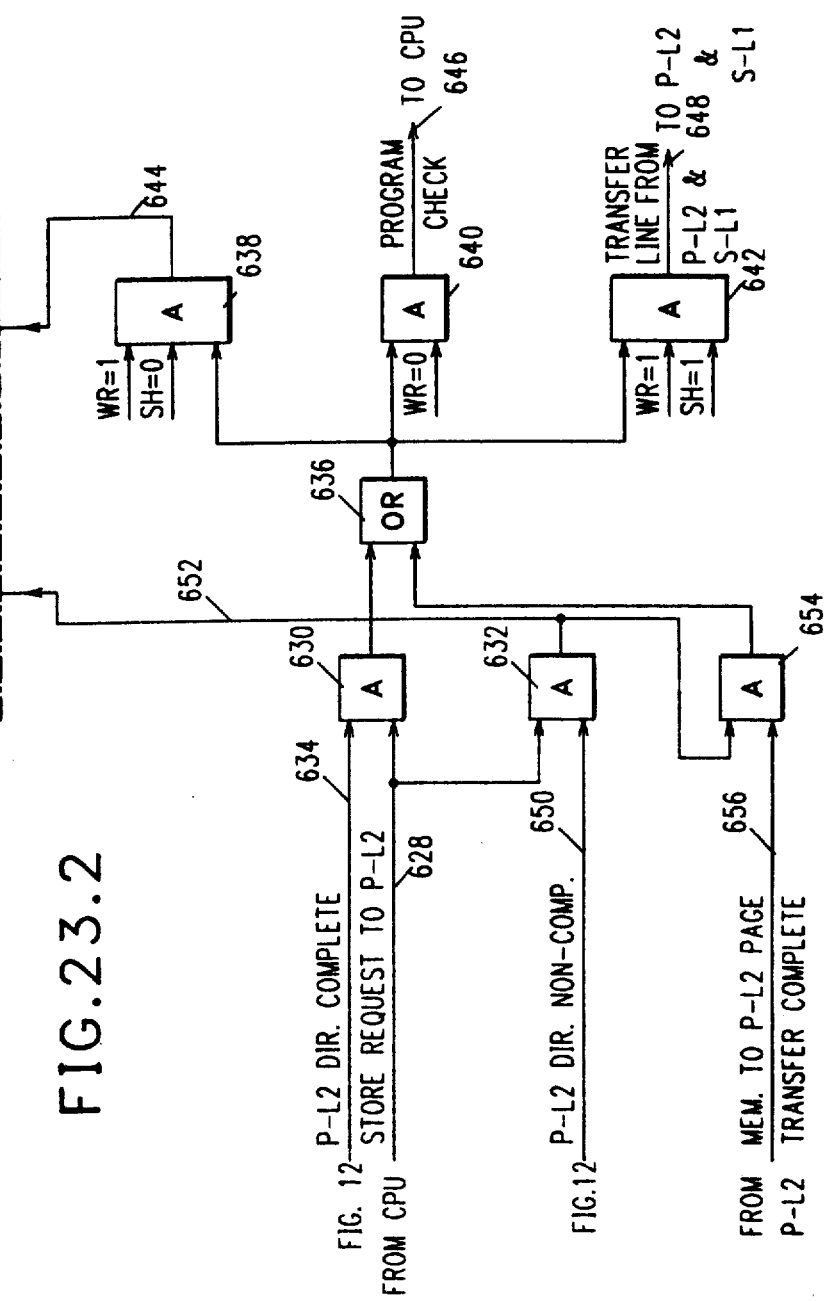
FIG. 23.2

THREE LEVEL MEMORY HIERARCHY USING WRITE AND SHARE FLAGS

DESCRIPTION

1. Technical Field

The invention is in the field of data processing, and specifically is directed to multiprocessing, multilevel memory organizations where each processor has two private caches, at level 1 and level 2, and each processor shares common caches at level 1 and level 2, and a common main memory at memory level 3.

2. Background Art

Most high performance processors have a private high speed hardware managed buffer memory in front of the main memory to improve average memory access time to the processor (CPU). This high speed buffer is sometimes termed a "cache" because it is usually transparent to a programmer.

In shared memory multiprocessing configurations there is a problem of each processor obtaining the most recent copy of main memory information because each cache is private to a given CPU. Sometimes this is solved by performing "stores" through to the main memory thus maintaining it current for all processors. This "store thru" (ST) cache is the type currently implemented in most large CPU's. The disadvantage of a ST cache is that all stores, which usually average between ten and twenty percent of all references, are sent to main memory, requiring substantial main memory bandwidth to avoid significant performance degradation. Consequently, the level of multiprocessing (MP), that is, the number of processors sharing the main memory is generally very limited with the ST cache unless a relatively high performance main memory is used.

In designs where there is insufficient main memory bandwidth to make "store thru" a viable solution, a store in buffer (SIB) cache is often implemented. SIB caches are described in U.S. Pat. Nos. 3,735,360 and 3,771,137 which are assigned to the assignee of the present invention.

A ST cache handles stores differently from fetches, that is, a store miss cannot occur because all stores go to main memory independent of the addressed line (target line) being in the cache. Conversely, a SIB cache treats stores and fetches the same; the line must be in the cache before performing the store or fetch. If the target line is not in the cache (cache miss) in line is transferred from main memory to the cache before performing the fetch or store. Because all subsequent stores to a line take place in the cache, the SIB cache substantially reduces the main memory bandwidth needed by the CPU compared to a ST cache design.

A problem with a SIB cache in a multiprocessing system is that the main memory is not kept current, the current information is often in the caches. Consequently, to insure that each processor receives current memory information, when a processor generates a fetch or store request to its private cache and the target line is not in the cache (line-miss), all CPU caches must be interrogated to determine if the line is present in the other caches (remote caches) and whether the line has been changed, that is, stored into. If the line is not in a remote cache, the line is fetched from main memory to the requesting processor's cache. If the line is in a remote cache but not changed, the line is invalidated in the remote cache, valid flag set to 0, and the line is transferred from main memory to the requesting processor's cache. If the line is in a remote cache and also changed, the line must first be transferred out of the cache to main memory before invalidating the line in the remote cache. After the line is transferred to main memory the requesting CPU then fetches the line to its cache and then performs the store or fetch.

This movement of a changed line that takes place on a cross interrogate hit entails substantial overhead because the remote processor must send a line to main memory (or directly to the other cache in some systems) and then the requesting processor must set the line into its private cache. Thus, two processors encounter interference and lost time. Even worse, many times the remote processor wants the line shortly after giving it up and the line ping-pongs between processors.

There are several multiprocessing systems known in the art, each having certain advantages and disadvantages. U.S. Pat. No. 3,581,291 to Iwamoto et al discloses a multiprocessor system in which each processor has a private cache and both processors share a main memory. The main memory is provided with a key memory which stores an indicator which indicates whether or not information in the main memory is read out and stored in each processor at each predetermined amount of its capacity.

U.S. patent application, Ser. No. 6,249,526 filed Mar. 31, 1981, entitled, "Multiprocessing System Including Shared Cache", which application is assigned to the assignee of the present invention, sets forth a multiprocessing system including private store in buffer caches, and a common shared cache and a common main memory, in which lines of information that are both shared and changed by the private caches are automatically detected and moved to the shared cache without going to main memory.

IBM Technical Disclosure Bulletin, Vol. 22, No. 2, July 1979, at pages 851–852, sets forth a partitioned memory and split SCE for an asymmetric multiprocessor, wherein each processor has a separate private cache.

IBM Technical Disclosure Bulletin, Vol. 18, No. 8, January 1976, at pages 2609–2610, sets forth a "Two-Loop Design in a two Level Storage Hierarchy", in which one storage loop operates off the system clock and the other storage loop operates independent of the system clock.

IBM Technical Disclosure Bulletin, Vol. 16, No. 6, November 1973, page 1847, Boehner et al and IBM Technical Disclosure Bulletin, Vol. 21, No. 3, August 1978, page 998 to Perkins et al, each set forth multiprocessor systems, each processor of which has a private cache but which have no shared memory other than the main memory.

Other art in the area of multiprocessing which is of general interest include U.S. Pat. No. 3,848,234 to McDonald; U.S. Pat. No. 3,735,360 to Anderson et al; and U.S. Pat. No. 3,845,474 to Lang et al.

According to the present invention, a multiprocessing system is set forth including three levels of memory. Levels 1 and 2 each includes a private cache for each processor and a shared cache which is shared by each processor. Level 3 includes a main memory which is shared by each processor. A WRITE flag and a SHARE flag are utilized per page. Pages which can be both written and shared are moved to the shared level 2 cache and then to the shared level 1 cache, with each processor executing from the shared level 1 cache. All other pages are moved to the private level 1 and level 2 caches of the requesting processor. Thus, a processor executes either from its private or shared level 1 cache. This system design allows several processors to share a common main memory without encountering the cross interrogation overhead associated with state of the art multiprocessing cache systems. The utilization of two cache levels permits one or more groups of high performance processors to share a relatively low cost-low performance main memory. Consequently, it is economically feasible to use a large capacity main memory to reduce the the reference rate to disk storage, achieving a good terminal response time in real time interactive applications.

BRIEF DESCRIPTION OF THE DRAWINGS

FIG. 1 is a system block diagram representation of a multiprocessing system including a three level memory hierarchy;

FIG. 2 is a block diagram representation of system level busing in a multiprocessing system including a three level memory hierarchy;

FIG. 3 is a table illustrating how the write and share bits are utilized in the multiprocessing system of the present invention;

FIGS. 4.1 and 4.2, when viewed with 4.1 on the top and 4.2 on the bottom set forth a flowchart diagram of a processor memory fetch request for the multiprocessing system of the present invention;

FIGS. 5.1 and 5.2, when viewed with FIG. 5.1 on the top and FIG. 5.2 on the bottom set forth a flowchart of the processor memory store request for the multiprocessing system according to the present invention;

FIGS. 6.1 and 6.2, when viewed with FIG. 6.1 on the left and FIG. 6.2 on the right set forth a block diagram representation of the cache access logic for a single processor;

FIG. 7 sets forth in table form an addressing scheme for the multiprocessing system according to the present invention;

FIG. 17 is a system block diagram of an alternative embodiment of the multiprocessing system including a three level memory hierarchy;

FIG. 18 is a system busing block diagram representation of the multiprocessing system set forth in FIG. 17;

FIG. 19 is a flowchart of the processor memory fetch request for the multiprocessing system of FIG. 17;

FIGS. 20.1 and 20.2, when viewed with FIG. 20.1 on the top and FIG. 20.2 on the bottom comprise a flowchart representation of the store request for the multiprocessing system set forth in FIG. 17;

FIG. 21 is a block diagram representation of the memory request logic for a priave L1 cache in a multiprocessing system as set forth in FIG. 17;

FIG. 22 is a block diagram representation of the memory request logic for a shared L1 cache in a multiprocessing system as set forth in FIG. 17; and FIGS. 23.1 and 23.2, when viewed with FIG. 23.1 on the top and FIG. 23.2 on the bottom, comprise a block diagram representation of the memory request logic for the private L2 cache in a multiprocessing system as set forth in FIG. 17.

DISCLOSURE OF THE INVENTION

Figure 8:
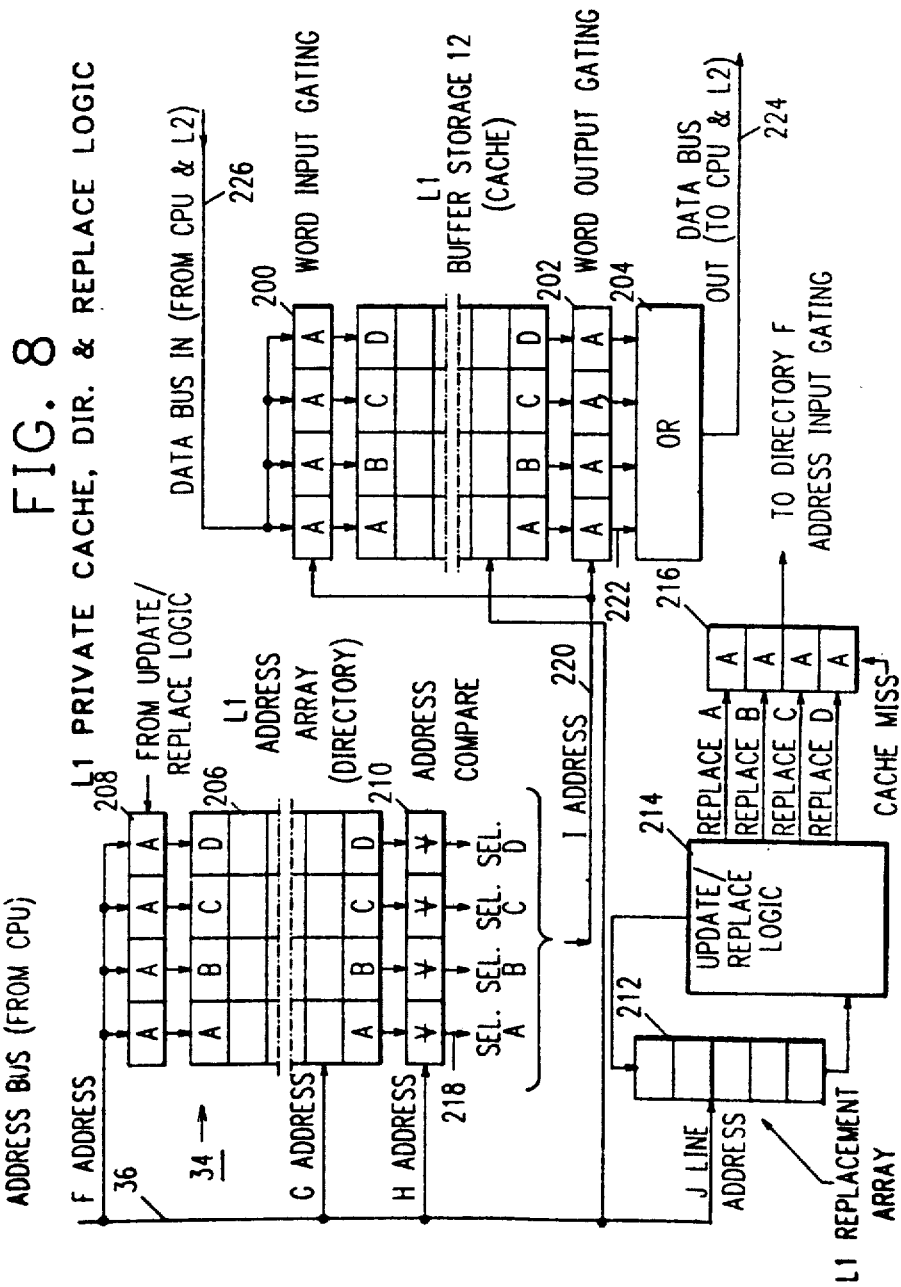
FIG. 8 is a block diagram representation of the level 1 private cache directory and replace logic for the multiprocessing system according to the present invention.

A multiprocessing three level memory hierarchy implementation which uses a WRITE flag and a SHARE flag per page. These two flag bits are set by software, allowing the software to communicate its knowledge of how pages are used to the hardware managed memory hierarchy. Essentially, pages which can be both written and shared are moved to the shared level 2 cache and then to the shared level 1 cache with the processors executing from the shared level 1 cache. All other pages are moved to the private level 2 and level 1 caches of the requesting processor. Thus, a processor executes either from its private or shared level 1 cache. This allows several processors to share a level 3 common main memory without encountering the cross interrogation overhead. The two cache levels permit one or more groups of high performance processors to share a relatively low cost-low performance main memory. Consequently, it is economic to use a large capacity main memory to reduce the reference rate to disk storage, achieving a good terminal response time in real time interactive applications.

BEST MODE OF CARRYING OUT THE INVENTION

A multiprocessing system including a three level memory hierarchy comprises of level 1 (L1), level 2 (L2) and level 3 (L3) is set forth generally at 2 in FIG. 2. Before describing the system operation, definitions of terminology used in describing the invention is set forth below. A binary ONE (1) or ZERO (0) will be used interchangeably throughout the specification.

Page

Unit of transfer between the main memory and the L2 cache. The L2 directory contains an entry for each page in the L2 cache. In virtual storage systems the page is the block size managed by the software in allocating virtual addresses to real addresses.

Cache Line

Unit of transfer between the L2 and L1 cache. Normally contains many CPU words. The cache directory holds an entry for each line in the cache indicating which main memory lines are presently in the cache.

Cache Hit

If the line containing the word addressed by the CPU is resident in the cache then it is referred to as either a fetch hit or a store hit depending on the type of request. A cache hit requires a directory address compare and a VALID flag equal to ONE.

Cache Miss

If the line containing the word addressed by the CPU is not resident in the cache then the CPU request results in either a fetch miss or a store miss depending on the request type. Either an address non compare or a VALID bit equal to ZERO will cause a line miss.

On a miss, the requested line must first be transferred into the cache before the reference can be completed. Some designs concurrently send the target word directly to the CPU so that processing can resume immediately.

Invalidation

The process of removing a valid line from the cache is called "invalidation" and it is accomplished by setting the valid bit to ZERO. If the line has been changed, as indicated by a CHANGE flag equal to ONE the line is first moved out of the cache before invalidating, that is, setting the VALID flag to ZERO.

Cross Interrogation

The action of interrogating other (remote) CPU caches on the occurrence of a line miss at the requesting CPU is called cross interrogation (XI). The presence or absence of the target line in the remote cache is called either a XI hit or XI miss respectively.

Line Status Bits

Each Line in the cache has an associated entry in the directory which, besides containing the main memory address of the line currently in the cache, contains several flag bits indicating the status of the cache resident line.

Valid (V)

If the cache does not contain a valid line at this location, then the V bit is set to zero. For example, at "power on" all V bits are reset to ZERO, indicating all lines are invalid. A valid bit of ZERO always causes a line miss. The appropriate VALID bit is turned off (it may already be off) on a line miss and turned on when a new line is brought into the cache. All caches have a valid bit per line or, in the case of L2 caches, there is a V bit per page.

Change (CH)

If a line in the private cache is stored into, then its CH bit is set to ONE, indicating it has been changed relative to the contents of main memory. Because all lines in the S cache are changed, no change bit per line is required in the S cache. The CH bit is set to ZERO when a line is brought into the private cache from memory. Major resets such as "power on" reset all CH bits to ZERO. When a changed line is moved from a L1 cache to a L2 cache, the change flag for the associated page is set to ONE.

The multiprocessing system 2 has operands and instructions contained in the shared main storage 4 at L3. Main storage 4 exchanges the instructions and operands with a plurality of processor groups via a system control element 6. An input/output bus 8 connects the system control element 6 to a plurality of peripheral devices such as direct access storage devices (DASD's). The system control element 6 is also connected to a first processor group comprised of processors A and B via the L2 and L1 private and shared cache configuration which will be described in more detail shortly. The system control element 6 is connected to other like processor groups via a bus 10. Each of the respective processor groups may include more than two processors, however, only two such processors are shown for simplicity of explanation. The key consideration as to which way to add additional processors is the bandwidth utilization of shared L1 and L2 caches. Until the utilization is above 50% it is generally less expensive and more efficient to add processors to a single shared L1 cache.

Each processor communicates directly, for information exchange purposes, with a private cache and a shared cache at L1 which is shared by each processor in the multiprocessing group. Lines of information are stored in each of the caches at L1, whereas the private and shared caches at L2 contain pages of information. Processor A communicates with its private cache 12 and a shared cache 14 at L1, with data exchange being via lines 16 and 18 respectively. If the line of information requested is not resident in either of the caches 12 or 14, a private cache 20 and a shared cache 22 at L2 are interrogated via lines 24 and 26 respectively to see if the page of information which contains the requested line is resident therein. If the page of information is resident therein, the requested line of information is transferred to either the L1 caches 12 or 14. If, on the other hand, the page of information is not resident in either the private or shared cache at L2, the system control element 6 is interrogated to request transfer of the page of information from a main memory at L3 to either the private cache 20 or the shared cache 22. Each page of information which is resident in the main memory 4 contains a WRITE flag and a SHARE flag which determines whether or not the requested page of information is provided to the private or the shared cache at L2. If the requested page of information is writable and sharable, that is the WRITE and SHARE flags are each a binary 1, (1,1), the requested page of information is transferred from the main memory 4 to the shared cache 22 via the system's control 6. In all other instances, the requested page of information is transferred to the private cache 20 at L2. These are the instances when a page of information is (1) read only and non sharable when the WRITE and SHARE flags are both at binary 0 (0,0), (2) when the WRITE and SHARE flags are read only and sharable when the WRITE flag is at a binary 0 and SHARE flag is at binary 1 (0,1), or when the page of information is writable and non sharable, that is the WRITE flag is at a binary 1 and the SHARE flag is at a binary 0 (1,0).

Processor B exchanges data with its private cache 27 at L1 and the shared cache 14 at L1 via lines 28 and 31 respectively. If a requested line of information is not resident in either the shared cache 14 or the private cache 27, the page of information containing the requested line is requested from processor B's private cache 30 at L2 and the shared cache 22 at L2 via lines 32 and 26 respectively. If the requested page of information is not resident in either the shared cache 22 or the private cache 30, the main memory 4 at L3 is interrogated via the system control element 6 to transfer the requested page of information to either the private cache 30 or the shared cache 22 at L2 with the page of information being transferred as determined by the WRITE and SHARE flags as set forth relative to the description for processor A.

FIG. 2 is a more detailed block diagram representation of the system level bussing for the multiprocessing system 2 and which illustrates the control and directory associated with each of the private and shared caches at L1 and L2. A cache control and directory 34 for private L1 cache 12 is connected to processor A via line 36 and to cache control and directory 38 for private L2 cache 20 via line 40, and to the storage and control element 6 via line 42. Processor A is connected to a cache control and directory 44 for shared L1 cache 14 via line 46 and to cache control and directory 48 for the shared L2 cache 22 via line 50, and to the stored control element 6 via line 52.

Processor B is connected to cache control and directory 54 for private L1 cache 27 via line 56 and to cache control and director 44 for shared L1 cache 14 via line 58. Cache control and directory 54 is connected to cache control and directory 60 for private L2 cache 30 via line 62 and to storage control element 6 via line 64. The cache control and directory elements respond to the respective READ and WRITE commands to determine if the requested line or page of information is resident in the respective caches, or whether or not the page of information must be fetched from the main memory as set forth generally relative to FIG. 1.1.

FIG. 3 is a table which illustrates how the cache control algorithms resident in the system control element 6 interprets the setting of the WRITE and SHARE flag bits in a page of information fetched from main memory 4. If both bits are ZERO, then upon demand, the page is moved to the private L2 cache of the requesting processor and the line requested by the processor, which is resident in this page of information, referred to as the target line, is moved to the L1 private cache where the processor accesses the requested word (target word) from the L1 cache.

If another processor tries to access this page of information, the ZERO state of the share bit will cause a "program check" to be sent back to the requesting processor and no page or lines will be transferred. If the processor attempts to write (store) into this page of information, the write will be blocked and a program check signal sent to the requesting processor. Essentially, this is a "non-shared" and "read only" page which can be resident in the private cache of only one processor. If the WRITE bit is ZERO and the SHARE bit ONE, the page and target line are moved into the requesting processor's private L2 and L1 caches. If another processor then requests this same page, it will also be moved into that processor's L2 cache, and the target line into its private L1 cache. However, if any processor tries to write (store) into the page, the write is blocked and a program check signals to the requesting processor. This is a "read only" page which can be shared, thus, a copy can reside in each processor's private caches but no stores are permitted. Generally, instructions will be so marked, that is, sharable but read only.

If the WRITE flag is ONE and the SHARE flag is ZERO, then this page is moved into the requesting processor's L2 private cache and the target line is then transferred into its private L1 cache. If another processor attempts to access this page, the access is blocked and a program check is signaled to the requesting processor. Stores to this page of information, however, are allowed.

Finally, if both the WRITE and SHARE flags are ONE, then this page of information is moved into the shared L2 cache, and the target line from this page of information is transferred into shared L1 cache where all processors may fetch or store into the line.

A request for this page of information from another processor in the same processor group (single shared L2 and L1 caches), will find the requested page in the shared L2 cache and the target line and word in the shared L1 cache. Consequently, both sharing and writing are permitted.

FIGS. 4 and 5 set forth processor memory "fetch request" and "store request" logic flow charts respectively which detail system operation in respect to the respective fetch and store request.

Refer now to FIGS. 4.1 and 4.2, which set forth the processor memory "fetch request" logic flowchart. In response to a "fetch request" from a given processor, the processor transmits a "fetch request" via line 68 to logic blocks 70 and 72 respectively to determine if the requested line of information is resident either in the private L1 cache of the requesting processor or in the shared L1 cache. At logic block 70 the question is asked, "Is there a line hit in the private L1 cache?". If the answer is yes, the line is fetched from the private L1 cache of the requesting processor as indicated at logic block 73, and the line transferred to the requesting processor with an end of memory fetch request then taking place as indicated at 74. If there is, on the other hand, no line hit in the private L1 cache as indicated at 76, the logic process would then go to logic block 78 pending the outcome of the "fetch request" at logic block 72. At logic block 72 the question is asked, "Is there a line hit in the shared L1 cache?". If the answer is yes, the line is fetched from the shared L1 cache as indicated at logic block 80, and the line is transferred from the shared L1 cache to the requesting processor with an end of memory fetch request occurring as indicated at 74. If, on the other hand, the answer is no, the logic process proceeds to logic block 78 via line 82.

If the answer to the logical question asked in logic blocks 70 and 72 are both no, indicating that the requested line is not resident at L1, the logic process proceeds from logic block 78 to logic blocks 84 and 86 respectively, to determine if the page of information containing the requested line is stored in the private or shared L2 caches, respectively. At logic block 84, the question is asked "Is there a line hit in the private L2 cache?". If the answer is yes, the logical process proceeds to logic block 88 which is indicative of moving the requested line of information from the private L2 cache to the private L1 cache, with the logic process then proceeding to logic block 73, with the system logic then proceeding as previously explained. If the answer is no as indicated at line 90, the logic process then proceeds to logic block 92 awaiting the outcome of the logical process at logic block 86.

At logic block 86, the question is asked "Is there a line hit resident in the shared L2 cache?". If the answer is yes, the logic process proceeds to logic block 94, which is indicative of the requested line being moved from the shared L2 cache to the shared L1 cache, with the logic process then proceeding as previously set forth. If the answer is no as indicated at line 96, the logic process proceeds to logic block 92. If the line is not resident in the private or shared L2 caches, the logic process then proceeds from logic block 92 to logic block 98 to access main memory and the tag array in the system control element.

The tag array contains 8 bits per page of main memory information. The left most two bits are the WRITE and SHARE flags respectively. The remaining 6 bits are processor identification flag bits indicating whether the page is in the associated processor's private L2 or L1 caches. If the page is in a processor's private cache, then the bit is ONE, otherwise it is ZERO. Thus, a tag bit as defined is sufficient for up to 6 way multiprocessing. The logic process then proceeds to logic block 100 where the question is asked, "Is the SHARE flag equal to ONE?". If the answer is yes, the logic process proceeds to logic 102, and if the answer is no the logic process proceeds to logic block 104.

If the answer to the question asked in logic block 100 is yes, the question is asked in logic block 102, "Is the WRITE flag equal to ONE?". If the answer is yes, the logic process proceeds to logic block 106 which is indicative of moving the page of information which contains the target line from main memory to the shared L2 cache and then to logic block 94 to move the line of the requested page from the shared L2 cache to the shared L1 cache as indicated at logic block 94 with the logical process then proceeding as previously set forth.

It is to be remembered, that when the WRITE and SHARE flags are both ONE, the page of information is transferred to the shared L2 cache, with the target line which is contained therein, then being transferred to the shared L1 cache, with the target line being fetched therefrom to the requesting processor. If the answer to the question in logic block 102 is no as indicated at line 108, the requested page of information is moved from main memory to the private L2 cache, and the CPU bit is turned on as indicated at logic block 110 with the logic process proceeding as previously set forth.

If the answer to the question asked at logic block 100 was no, the logic process then proceeded to logic block 104 where the question is asked, "Is any CPU bit equal to ONE?". If any CPU bit is ONE, then a "program check" signal is transmitted to the requesting processor as indicated at logic block 112. If all CPU bits are ZERO, then the page is moved to the private L2 cache and the CPU bit turned on as indicated at logic block 110. The target line is then moved to the private L1 cache as indicated at logic block 88 with the fetch then being completed as indicated logic block 73.

Refer now to FIGS. 5.1 and 5.2 which set forth the processor memory "store request" logic flowchart. In response to a given processor's memory "store request" as indicated at line 114, the logic process proceeds to logic blocks 116 and 118 to determine if the target line is resident in either the private or the shared L1 caches respectively. At logic block 116, the question is asked, "Is the target line resident in the private L1 cache?". If the answer to this question is yes, the logic process proceeds to logic block 120 and if the answer is no, as indicated at line 122, the logic process proceeds to logic block 124. When the answer is yes to the question asked at logic block 116, the question is than asked at logic block 120, "Is the write flag equal to ONE?". If the answer is yes, the logic process proceeds to logic block 126 and a store is made into the private L1 cache, and the processor is signaled that there is an end of a memory store request as indicated at 128. If the answer is no, the logic process proceeds to logic block 130 which is indicative of a signal program check.

At logic block 118, the question is asked "Is the line resident in the shared L1 cache?". If the answer is yes, the logic process proceeds to logic block 132 which is indicative of a store being made to the shared L1 cache, with an end of memory store request then being signaled to the requesting processor as indicated at 128. If on the other hand, the answer is no the logic process proceeds to logic block 124, and if coincident therewith the answer to the question asked at logic block 116 was no, which is indicative of the requested lines not being a L1, the logic process then proceeds to logic blocks 136 and 138 to determine if the target line is resident in a page stored in one of the L2 caches.

At logic block 136, the question is asked, "Is the target line resident in the private L2 cache?". If the answer is yes, the logical process proceeds to logic block 140, and if the answer is no as indicated at line 142, the logic process proceeds to logic block 144. At logic block 140 the question is asked, "Is the write flag equal to ONE?". If the answer is yes, the logic process proceeds to logic block 146 and the target line is moved from the private L2 cache to the private L1 cache, with the logic process then proceeding to logic block 120, with the logic process then proceeding as previously set forth. If the answer to the question at logic block 140 is no as indicated at line 148, the logic process then proceeds to logic block 130 to signal a program check.

At logic block 138 the question is asked, "Is the target line resident in the shared L2 cache?". If the answer is yes, the logic process proceeds to logic block 150 which is indicative of the target line being moved from the shared L2 cache to the shared L1 cache with the store of the target line in the shared L1 cache being made as indicated at logic block 132. An end of memory store request is then provided to the requesting processor as indicated at 128. If the answer to the question asked in logic block 138 is no, as indicated at 152, the logic process proceeds to logic block 144 and if coincident therewith the answer to the question asked in logic block 136 is no, which is indicative of the target line not being in either the L1 or L2 level caches, the main memory is accessed as well as the tag array in the system control element as indicated at logic block 154.

The logic process then proceeds to logic block 156 where the question is asked, "Is the WRITE flag equal to ONE?". If the answer is yes, the logic process proceeds to logic block 158, and if the answer is no, the logic process proceeds to logic block 130 to signal a program check. At logic block 158 the question is asked "Is the SHARE flag equal to ONE?". If the answer is yes, the requested page of information is transferred from the main memory to the shared L2 cache as indicated at logic block 160, with the logic process then proceeding to logic blocks 150 and 132 as previously explained. If the answer to the question asked in logic block 158 is no, as indicated at line 162, the logic process proceeds to logic block 164, where the question is asked, "Is any CPU bit equal to ONE?". If the answer is yes, the logic process proceeds to logic block 130 to signal a program check. If the answer is no, the logic process proceeds to logic block 166 which is indicative of the requested page of information being moved from main memory to the private L2 cache of the requesting processor and the turning on of the CPU bit. The logic process then proceeds to logic blocks 146, 120 and 126 respectively to perform the logic funtions associated therewith as previously set forth.

In processors that contain storage protect keys, such as the IBM/370, the tag array could be implemented as part of the storage protect memory, or in processors implementing virtual addressing, the tag array could be implemented as part of the relocation page table.

However, in the implementation set forth, it is assumed to be a separate array in the system control element and is written into by a "set tag array" instruction.

It is read into a general purpose register (for inspection by the software) by the "insert tag array" instruction. These two instructions work identically to the two storage protect instructions in the IBM/370; "set storage key" and "insert storage key", except of course they operate on a tag array as opposed to the storage protect array.

FIG. 6.1 and FIG. 6.2 comprise a block diagram illustrating how a single processor in this instance processor A, accesses its private and shared caches. A memory request is initiated by sending a memory request and address to both the private and shared L1 cache directories. If there is an address compare at either directory and the line is valid (V=1), then the associated L1 cache is accessed. Assuming a four-way set associative cache, four words are read out in parallel from the cache and the requested word is gated to or from the processor.

If there is no compare at either the private or the shared L1 cache, then the private and shared L2 cache directories are accessed to determine if the page containing the target line is at L2. A compare at either L2 cache causes the target line to be moved into the respective L1 cache where the word access by the processor is completed.

Both caches at L1 or L2 can be accessed in parallel because a line or page is either in the private caches or shared caches but never in both simultaneously.

The following is a detailed description of the cache access for processor A. It is to be appreciated that a cache access for processor B operates in a like manner. Consider now a representative memory request sequence of operation. The address of the target line is provided via lines 36 and 46 to the private L1 directory 34 and the shared L1 directory 44 respectively as well as to an AND gates 164 and 170. If the target line is resident in the L1 private cache 12, the directory 34 provides an ACCESS signal via line 166 to private L1 cache 12 and the requested line of information is provided via line 16 to the processor A. In the event the target line is not resident in private L1 cache 12, a private L1 directory $\overline{\text{COMPARE}}$ signal is provided to first inputs of the AND gate 164 and the AND gate 170.

If the target line is resident in shared L1 cache 14, the shared L1 directory 44 provides an ACCESS signal via line 172 to shared L1 cache 14 and the target line is read therefrom via line 18 to processor A. On the other hand, if the target line is not resident in the shared L1 cache 14 a S-L1 DIR. $\overline{\text{COMPARE}}$ signal is provided via a line 174 to the second inputs of AND gates 164 and 170 respectively, which is indicative, when both of these signals are present, that the target line was not resident in either of the L1 caches. In this instance, the AND gate 164 passes the target line address on line 46 to the shared L2 directory 48 via a line 176, and the AND gate 170 passes the line address on line 36 to the private L2 directory 38 via the line 178.

The $\overline{\text{COMPARE}}$ signals on lines 168 and 174 are also applied to AND gate 180, which provides ACCESS signals on lines 182 and 184, respectively, to the shared and private L2 directories 48 and 38, respectively. If the page of information containing the target line is present in the private L2 cache 20, a PRIVATE L2 DIRECTORY COMPARE signal is provided via line 186 to the private L2 cache 20 for gating out the target line at the address indicated on line 188 to the private L1 cache 12 via the line 24 and then to the processor A via the line 18. On the other hand, if there was not a directory compare in directory 38, a P-L2 DIR. $\overline{\text{COMPARE}}$ signal is provided via line 190 to the AND gate 192.

When the shared L2 directory 48 is accessed and there is an S-L2 DIR. COMPARE, this gating signal is provided via line 194 to the shared L2 cache 22 to gate therefrom the target line as indicated by the LINE ADDRESS signal on line 188 to the shared L1 cache 14 via the line 26 and then to the processor A via the line 18. On the other hand, if there is not a directory compare from the directory 48, a S-L2 DIR. $\overline{\text{COMPARE}}$ signal is provided via line 196 to the AND gate 192.

The coincidence of the $\overline{\text{COMPARE}}$ signals on the input lines 190 and 196 to AND gate 192 is indicative of the target line not being present at either L1 or L2, and an ACCESS MAIN MEMORY signal is provided via line 198 to the system control element 6 to fetch the page of information containing the target line from the main memory. This signal is then provided to the private or shared L2 caches dependent upon the states of the WRITE and SHARE flag bits for this page, as previously explained.

FIG. 7 illustrates the addressing scheme for a 24 bit memory address for accessing a private or shared cache. The same address bits are used independent of whether the cache and its associate hardware is a private or shared cache.

Refer now to FIG. 8 which is a detailed block diagram representation of the private L1 cache 12 and its associated cache control and directory 34 for processor A. The private cache 27 and its associated cache control and directory 54 for processor B is identical and operates in the same manner as is to be described. The system shown is a typical four-way set associative cache, directory and update/replacement array and logic. The private L1 cache 12 includes a word input gating network 200, a word output gating network 202, and an OR gate 204. The cache control and directory 34 includes an address array 206, address input gating network 208 and address compare network 210. The update replacement array is comprised of a replacement array 212, update/replace logic 214 and an address gating network 216. The address on lines 36 from processor A is used to address the directory/cache and replacement array.

FIG. 7, as previously set forth, is a diagram indicating how the bits of an assumed 24 bit memory address are assigned to the major elements set forth in FIG. 8. The F address is provided to the address input gating logic 208 and the G address to address array 206, and the H address to the address compare network 210. The four addresses which are concurrently read out of the directory 206 to the address compare network 210 are compared with the proper bits of the memory address on the H address line to determine which of the four address, if any, compare. For example, if the A address compares and its VALID bit equals ONE, then the A word is read out of the cache. This is accomplished by a gating signal on the SEL. A line 218 being provided via line 220 to the buffer storage L1 cache 12 and the word output gating network 202. The SEL. A signal is also provided, to processor A. Line 222 from word output gating 202 provides the requested data to OR gate 204 and to data bus out 224. If none of the four words compare, then a MISS signal is generated. If a store operation is to be accomplished, data in on the bus 226 is provided to the word input gating network 200, and the SELECT A signal on line 220 enables word input gating 200 to provide the data in to the buffer storage L1 cache 12.

The replacement array 212 and its associated logic network 214 keep track of which of the four lines in each set of associative class has been least recently referenced or use. The details of least recently used (LRU) replacement logic is described in U.S. Pat. No. 4,008,460 which is assigned to the assignee of the present invention, and accordingly the operation of the logic will not be described in detail herein.

Figure 9:
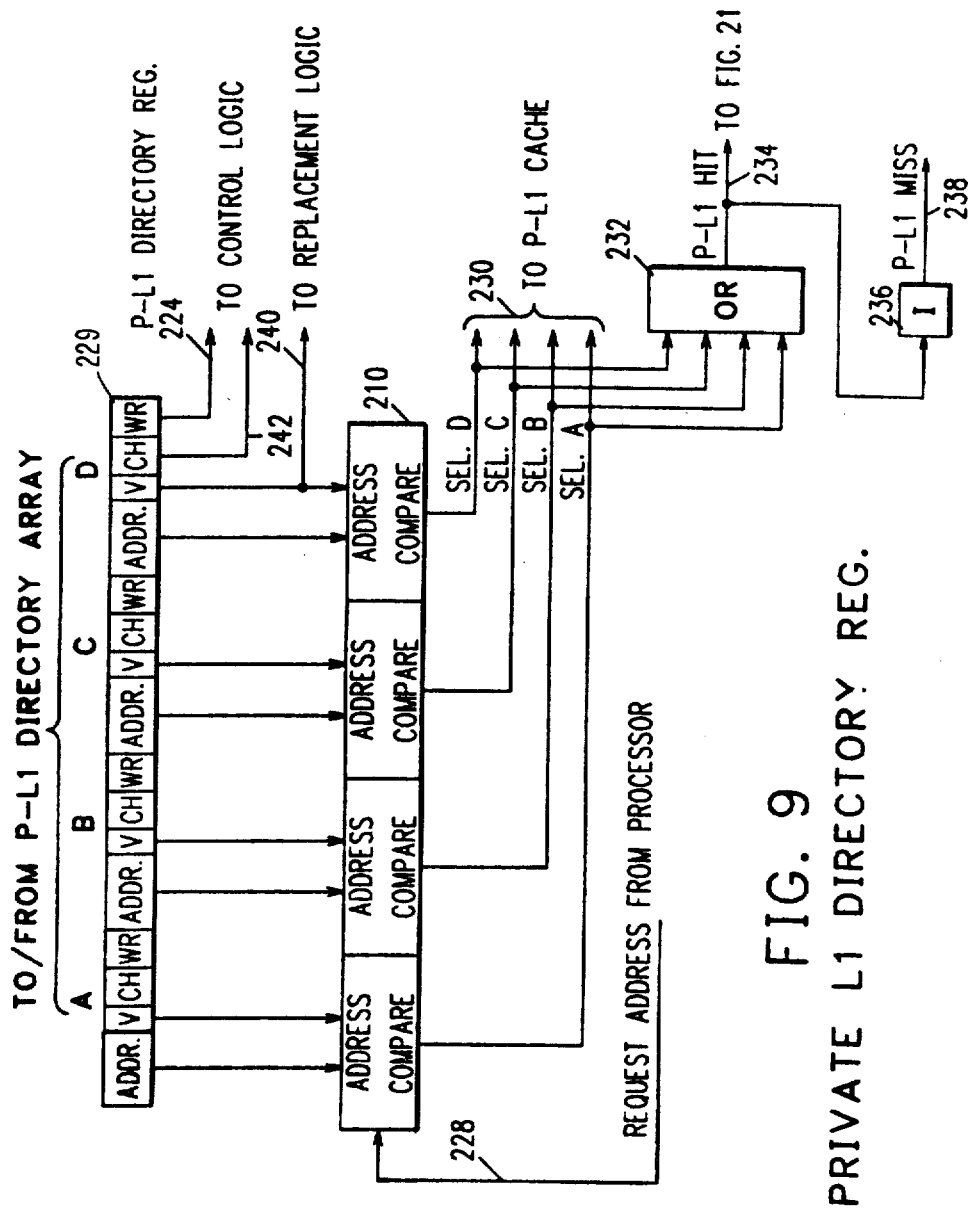
FIG. 9 is a block diagram representation of the private level 1 directory register for the multiprocessing system according to the present invention.

Refer to FIG. 9 which is a detailed diagram of the directory register for the private L1 cache. When the directory is accessed at a particular address via the line 228, the directory register 229 receives the contents of that address, namely the four address A, B, C and D and associated STATUS flag bits, that is the VALID (V), CHANGE (CH) and WRITE (WR) status flag bits. These four addresses are compared in parallel with the requested address on line 228 in the address compare network 210 to determine if the requested line is in the cache. If there is a COMPARE equal and the assoicated VALID flag is ONE, then the compare circuitry activates the appropriate select line to the cache. That is, either the line SEL A, SEL B, SEL C, or SEL D, has a ONE thereon which is applied to the private L1 cache as indicated at 230. These SELECT signals are also applied to an OR gate 232 which provides a P-L1 HIT signal on a line 234 with this signal also being applied to an inverter 236 which provides a P-L1 MISS signal on line 238.

The VALID flag bits on line 240 are also provided to the replacement logic, because on a MISS, a line with a VALID flag equal ZERO (invalid) is always replaced before a least recently used (LRU) line.

As previously set forth, each line also has CH and WR flags which are inputs to the control logic circuitry via lines 242 and 244 respectively. The WR flag must be ONE to permit stores and if the CH flag is ONE, the line must be moved (read out) to private L2 cache on a miss.

Figure 10:
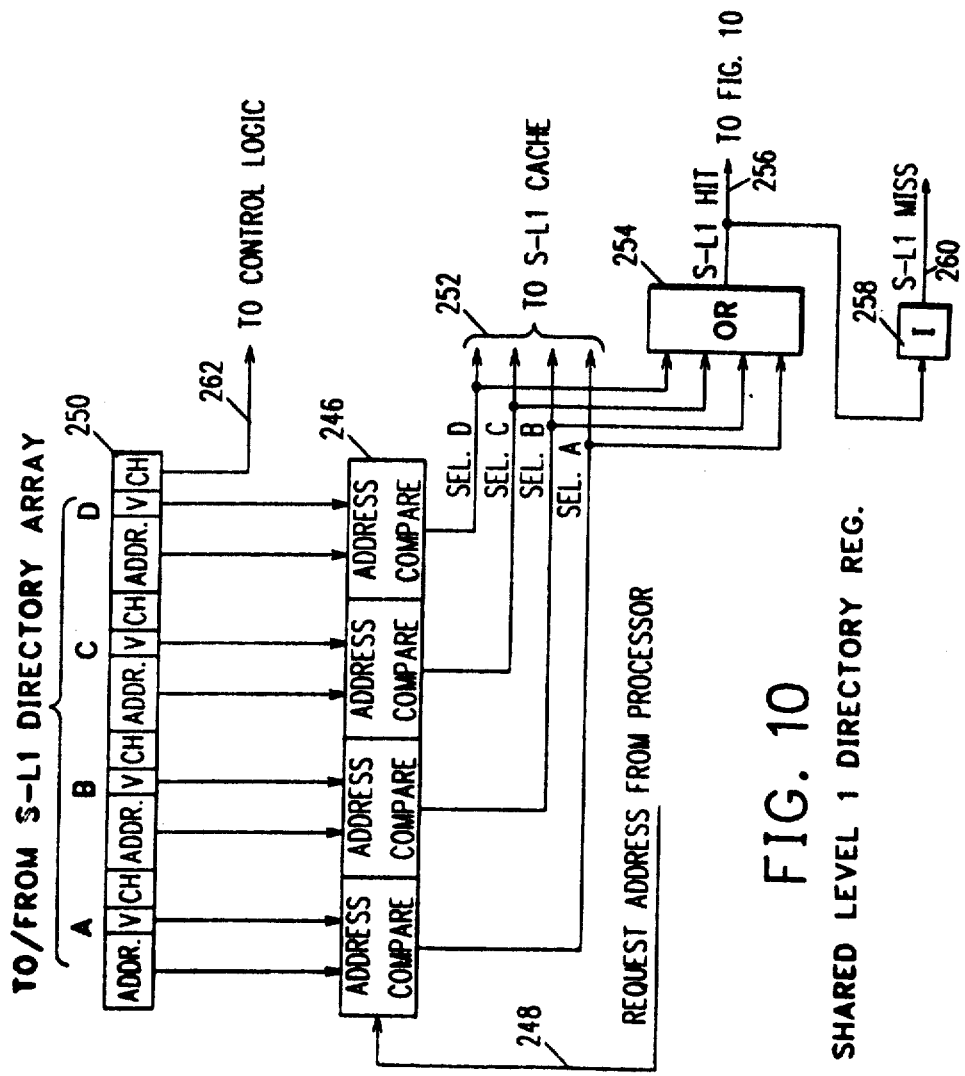
FIG. 10 is a block diagram representation of the shared level 1 directory register logic for the multiprocessing system according to the present invention.

Refer now to FIG. 10 which illustrates the directory register for the shared L1 cache. The address compare network 246 receives an address request via the line 248 and receives the respective adresses A-D from the register 250. The register 250 is the same as the register 299 in FIG. 9, except that there are no WR flags. This is so because all lines in the shared L1 cache must have WRITE and SHARE flags equal to ONE or they would not be in the L1 shared cache. A CHANGE flag is required for each line in the shared L1 cache directory to indicate if a store actually took place and therefore, the line must be cast out on a miss. If the addresses compare in the network 246 and the associated VALID bit is ONE, then the compare network 246 activates the appropriate select line to the cache, as indicated at 252. These SELECT signals are also provided to an OR gate 254, with a S-L1 HIT signal being provided on a line 256 and to an inverter 258 for providing a S-L1 MISS signal on line 260. The CHANGE bits on line 260 from register 250 are provided to the control circuitry for the same purposes as set forth relative to FIG. 9.

It is to be remembered that all of the caches are conventional four-way set associative cache organizations. Four addresses are read out of the directory in parallel. If one of the four addresses read out of the directory, designated A, B, C, or D, compares with the request address and its VALID bit equal ONE, then the cache is accessed reading out the four words in parallel. These words are designated A, B, C, or D, to coincide with their associated line address read out of the directory. The output of the directory compare circuitry gates the selected word from the cache word register to the data bus out. For example, if address C compares, then word C is gated to/from the processor. The LRU replacement array is updated to indicate that the selected line is most recently used.

If neither L1 directory has a compare, indicating a line miss, then the request address is sent out to the next level in the memory, in this particular instance the level two caches. If there is a L2 directory compare (cache hit), then the target line is brought into the respective L1 cache and its address is stored in the directory. The line that is replaced is indicated by the update/replacement logic. As previously set forth, the private L1 cache contains three flags for each cache line, and they are defined as follows. The V bit is turned off on "power on" and major resets, and is turned on when a new line is brought into the cache. In a multiprocessing system, the VALID flag is turned off on a cross interrogate hit.

The CH bits are turned on when a line is changed, that is, stored into. The WR bit is turned on when the line is fetched from L2 and the L2 pages WRITE flag is ONE. The shared L1 cache has only a V and CH flag per line. It has the same function as in the private L1 cache.

Figure 11:
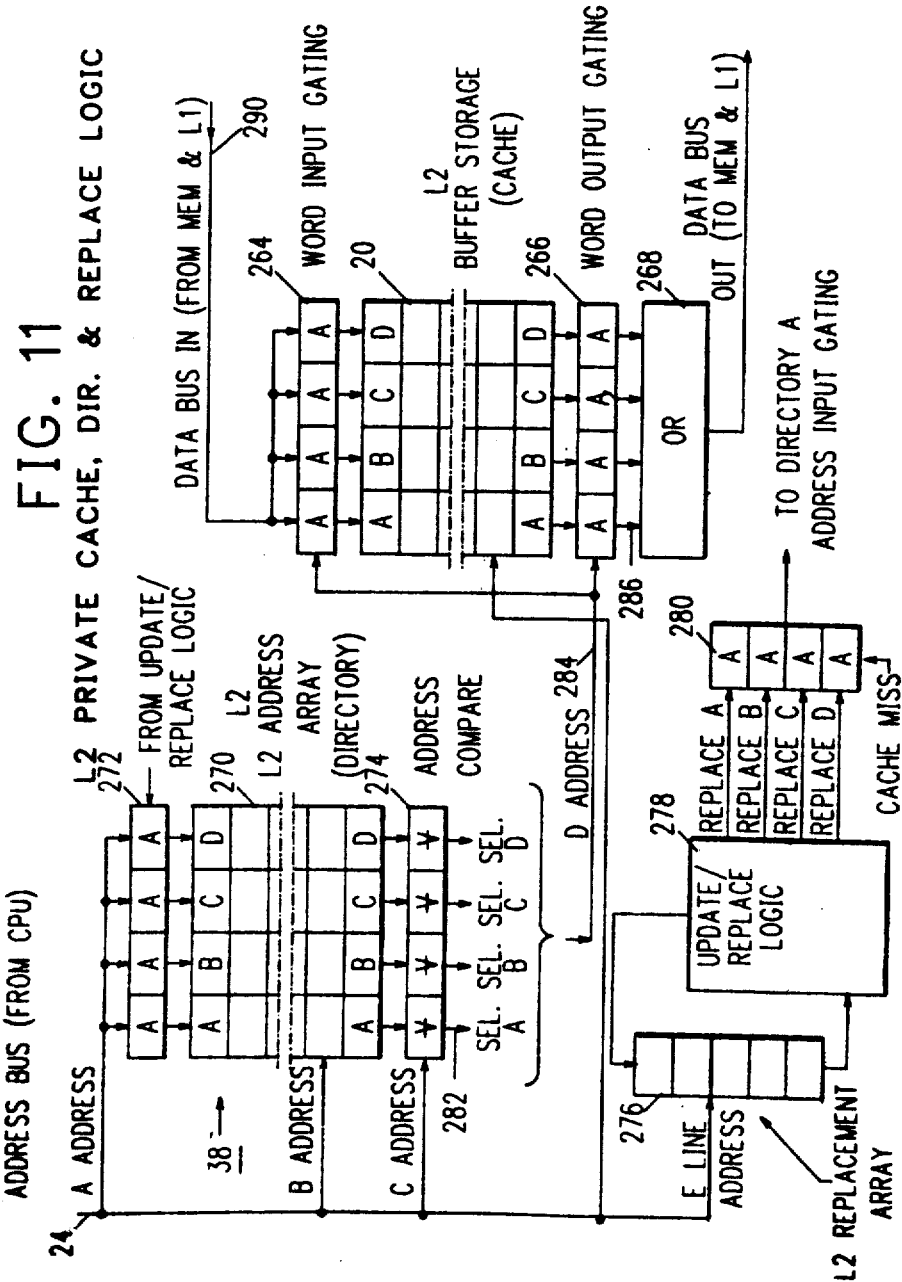
FIG. 11 is a block diagram representation of the level 2 private cache directory and replacement logic for the multiprocessing system according to the present invention.

Refer to FIG. 11, which is a block diagram representation of the L2 private cache directory and update/replacement logic which operates in a manner similar to that described for the L1 logic set forth in FIG. 8. In the case of the L2 directory, its stored addresses indicate which pages are in the L2 private cache. The L2 cache itself is addressed down to the line level because this is the unit that is read out of the L2 cache and transferred between the L2 and L1 caches.

The logic includes the private L2 cache 20 and its associated cache control and directory 38 for processor A. The private L2 cache 20 and its assocaited cache and control directory 38 for a processor B is identical and operates in the same manner as is to be described. The system shown in a typical four-way set associative cache, directory, an update/replacement array and logic. The private L2 cache 20 includes a word input gating network 264, a word output gating network 266 and an OR gate 268. The cache control and directory 38 includes an address array 270, address input gating 272 and an address compare network 274. The update replacement array is comprised of a replacement array 276, update/replace logic 278 and an address gating network 280.

The address on line 24 from processor A is used to address the directory, cache and replacement array. FIG. 7 is a diagram indicating how the bits of an assumed 24 bit memory address are assigned to the major elements set forth in FIG. 11. The A address is provided to the address input gating logic 272 and the B address to address array 270, and the C address to address compare network 274. The four address which are concurrently read out of the directory 270 to the address compare network 274 are compared with the proper bits of the memory address on the C address line to determine which of the four addresses, if any, compare. For example, if the A address compares and its VALID bit equals ONE, then the A word is read out of the cache. This is accomplished by a gating signal on the SELECT A line 282 being provided via a line 284 to the buffer L2 cache 20 and the word output gating network 266. Line 286 from the word output gating network 266 provides the requested data to OR gate 268 and to data bus out 288. If none of the four words compare, then a MISS signal is generated. If a store operation is to be accomplished, data in on bus 290 is provided to the word input gating network 264 and the SELECT A signal on line 284 enables word input gating 264 to provide the data in to the buffer storage L2 cache 20.

The L2 replacement array 276 and its associated logic network 278 and 280 keep track of which of the four lines in set associative class has been least recently referenced or used. The details of least recently used (LIU) replacement logic is described in U.S. Pat. No. 4,008,460 which is assigned to the assignee of the present invention, and accordingly the operation of the logic will not be described in detailed herein.

Figure 12:
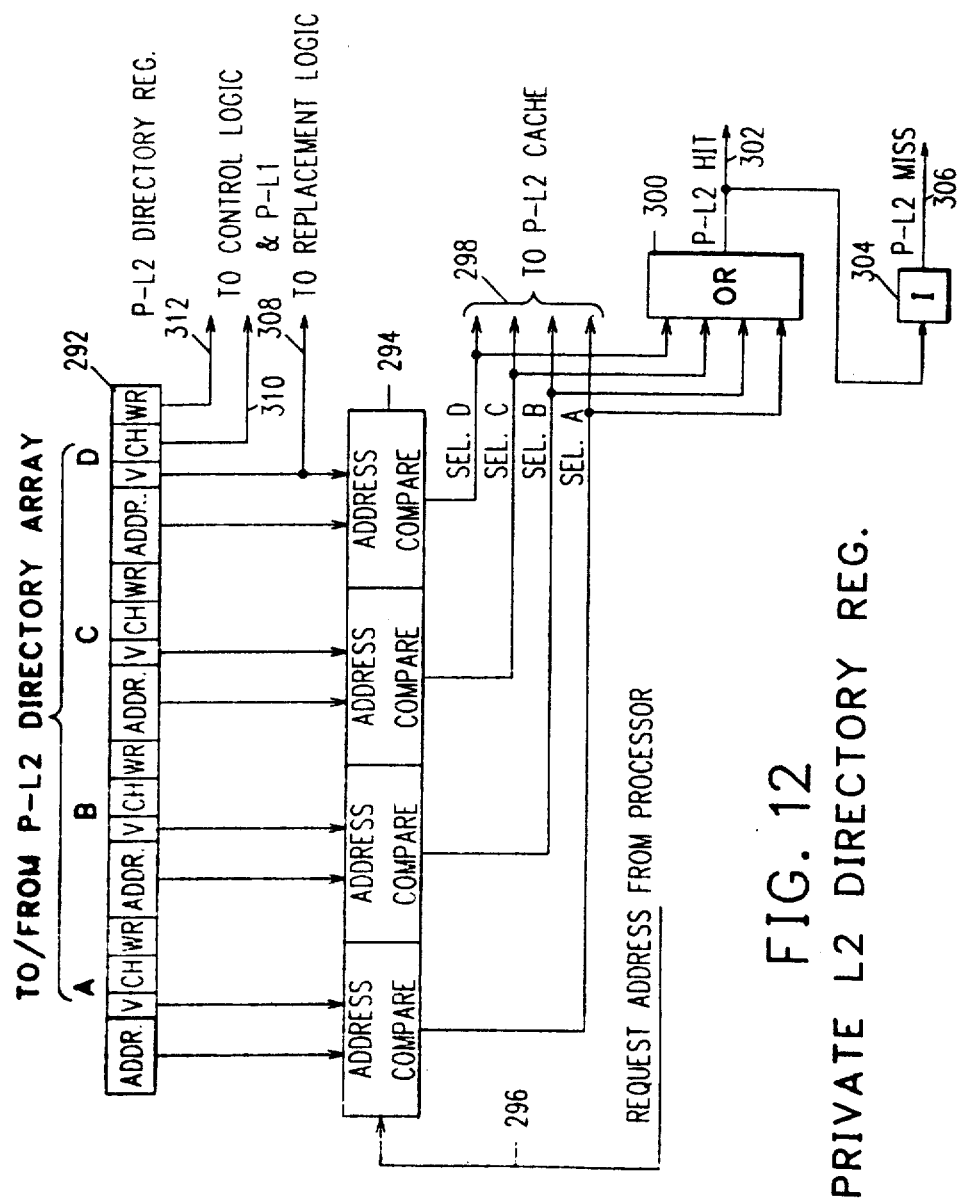
FIG. 12 is a block diagram representation of the private level 2 directory register for the multiprocessing system according to the present invention.

FIG. 12 is a block diagram representation of the private L2 directory register, which is similar to the private L1 directory register set forth in FIG. 9. Note that the flat bits per page are the same as the private L1 directory as per each line. Since no stores actually take place at L2 but instead at L1, the page WR flat at L2 is passed to the L1 directory when a line is moved from the private L2 cache to the private L1 cache. When a changed line is cast out from the private L1 cache to the private L2 cache, the private L2 CH flag is set to ONE. The addresses A, B, C and D from the private L2 directory array are provided to the directory register 292, with the respective addresses in their associated V bit being applied to an address compare network 294, which also receives the request address signal from the processor on line 296. When there is an address compare and the associated V bit is ONE, a SEL. A, SEL. B, SEL. C, or SEL. D signal is provided to the private L2 cache as indicated at 298. These signals are also provided to OR gate 300 which provides at the output thereof on line 302 a P-L2 HIT signal, which is also provided to an inverter 304 which provides on output lines 306 thereof a P-L2 MISS signal. The V bit on line 308 from each of the addresses stored in register 292 are provided via line 308 to the replacement logic, and the CH and WR bits are provided via lines 310 and 312, respectively to the control logic and the private L1 cache.

Figure 13:
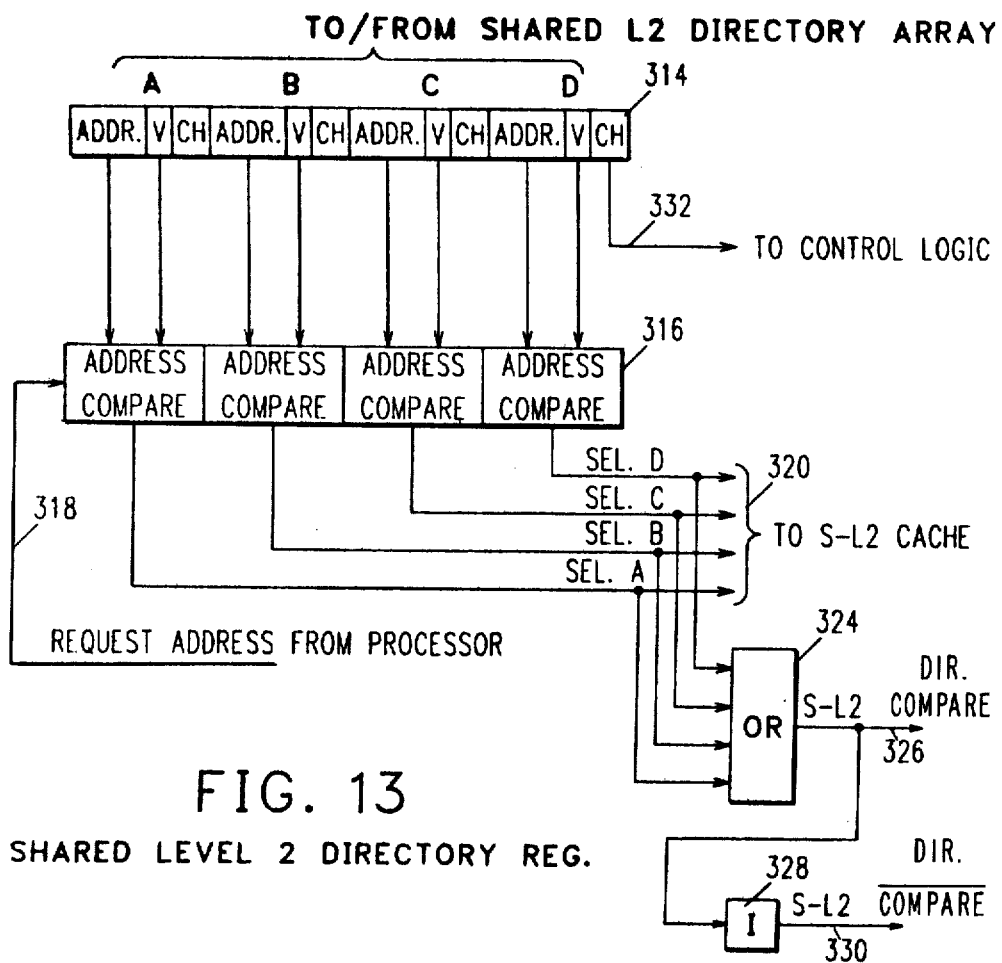
FIG. 13 is a block diagram representation of the shared level 2 directory register for the multiprocessing system according to the present invention.

FIG. 13 is a block diagram representation of the shared L2 directory register which is similar to the shared L1 directory register set forth in FIG. 10. The shared L2 directory does not contain a WR flag, since all lines in the shared L2 cache must have WRITE and SHARE flags equal to ONE or they would not be in the shared cache. A CH flag is required for each line in the shared L2 directory to indicate whether a store actually took place and therefore must be cast out on a MISS. The addresses A, B, C and D are provided to the register 314, with the address and it associated valid bits being applied to the address compare network 316 which has applied thereto via line 318, a request address signal from the processor. In the event there is an address compare and the associated VALID bit is ONE, the appropriate SEL. A, SEL. B, SEL. C, or SEL. D is at a ONE level, and these signals are applied to the shared L2 cache as indicated at 320. These signals are also applied to an OR gate 324 which provides at the output thereof on line 326 a S-L2 DIRECTORY COMPARE signal which is also provided to the input of an inverter 328 which provides at the output thereof on line 330 a S-L2 DIRECTORY $\overline{\text{COMPARE}}$ signal when there is no address compare. The CH bits from the register 314 are provided on line 332 to the control logic for reasons previously set forth.

Figure 14:
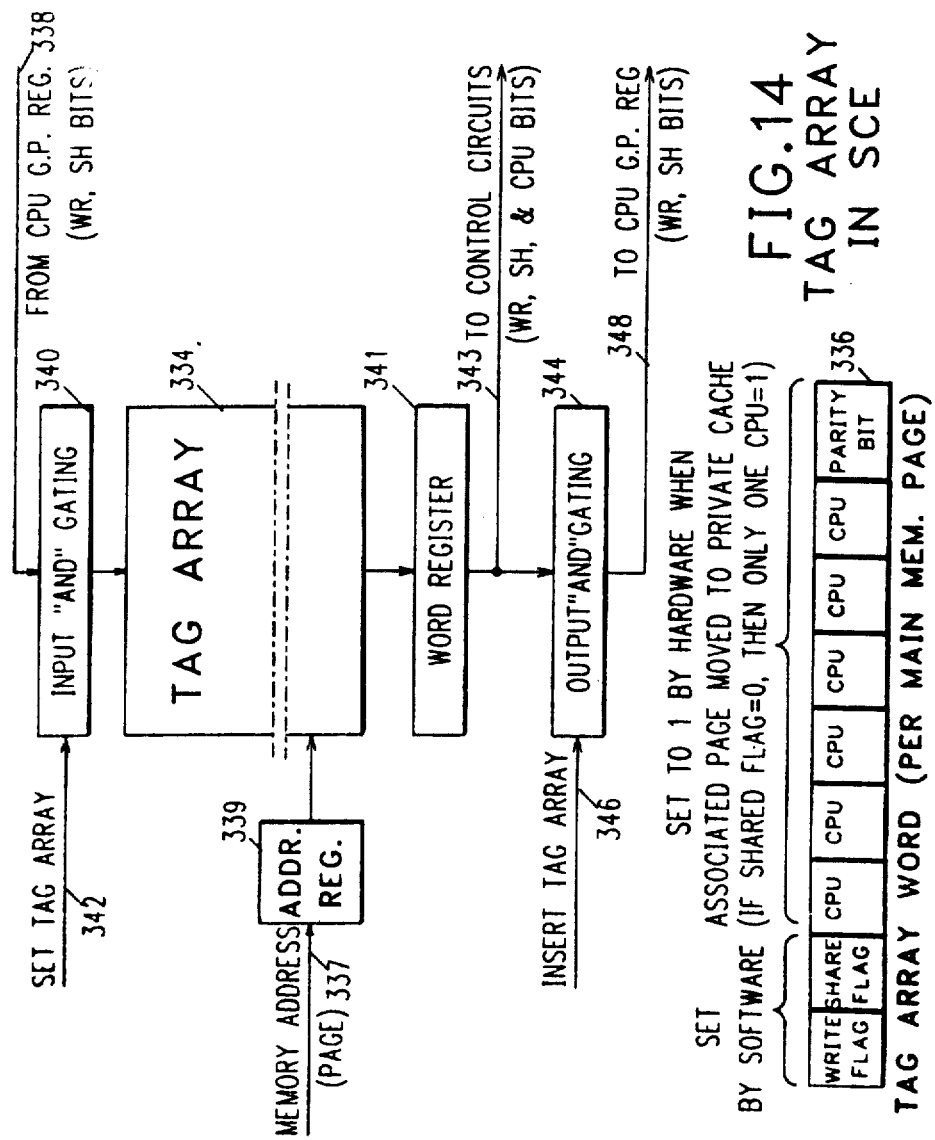
FIG. 14 is a block diagram representation of the tag array in the system control element of the multiprocessing system according to the present invention.

FIG. 14 is the block diagram representation of the tag array in the system control element 6. When the system control element requests a page from main memory, it concurrently accesses the tag array 334 in the system control element 6. The tag array contains 8 bits per page of main memory as indicated at 336. The left most two bits are the WRITE and SHARE flags. The remaining 6 bits are processor identification flag bits indicating whether the page is in the associated processor's private L2 or L1 caches. If the page is in a processor's private cache, then the bit is ONE, otherwise it is ZERO. Thus the tag byte as defined is sufficient for up to six-way multiprocessing.

If both the write and share flags are in the ONE state, the requested page is moved to the shared L2 cache and the target line is moved to the shared L1 cache where the target word is fetched.

If share flag is ZERO then the CPU FLAG bits are tested to determine if they are all ZERO. If any CPU bit is ONE, then a "program check" signal is sent back to the requesting processor. If all CPU bits are ZERO, then the page is moved to the private L2 cache and the target line is moved to the private L1 cache where the fetch is completed. The requesting processor's CPU bit in the tag array is also set to ONE at the time the page is moved to the private cache.

The WR and SH bits are provided from the CPU general purpose registers via line 338 to an input AND gating network 340 which is enabled by a SET TAG ARRAY signal on line 342 for gating the WR and SH bits into the tag array 334. The memory address for a given page of information is applied via line 337 to an address register 339 for reading out the WR, SH and CPU bits from the tag array 334 to a word register 341, with these bits being applied via line 343 to the control circuits and to an output gating output AND gating network 344 which is enabled by an INSERT TAG ARRAY gating signal on line 346 for enabling the network 344 to apply these bits via line 348 to the CPU general purpose registers.

In processors that contain storage product keys, such as the IBM/370, the tag array 334 could be implemented as part of the storage protect memory, or, in processors implementing virtual addressing, the tag array could be implemented as part of the relocation page table.

However, in the implementation set forth, it is assumed to be a separate array in the system control element 6 and is written into by a "SET TAG ARRAY INSTRUCTION". It is read into a general purpose register (for inspection by the software) by the "insert tag array" instruction. These two instructions work identical to the two storage protect instructions in the IBM/370; "set storage key" and "insert storage key", except of course they operate on the tag array as opposed to the storage protect array.

Figure 15:
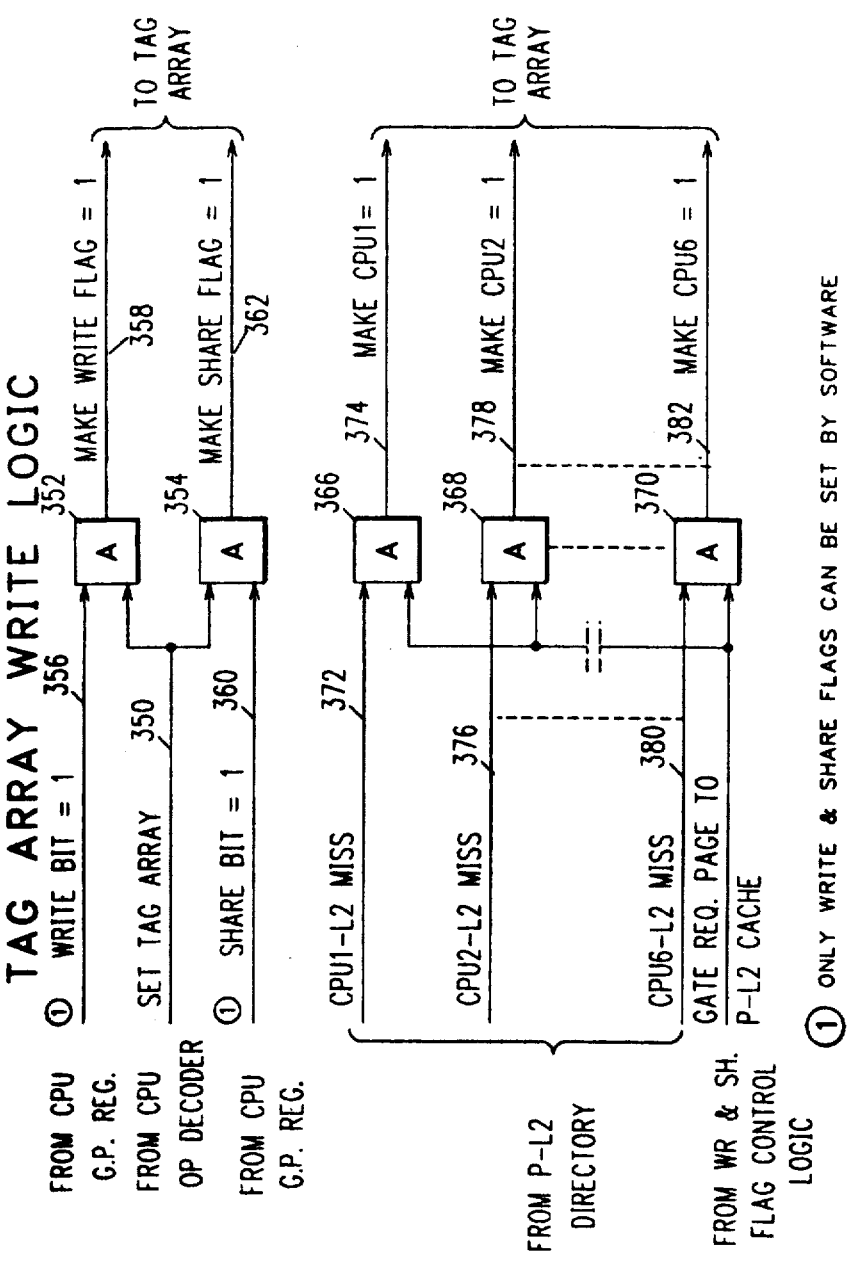
FIG. 15 is a block diagram representation of the tag array write logic in the multiprocessing system according to the present invention.

FIG. 15 illustrates the logic for writing into the tag array. When the software wants to set the WRITE and SHARE flags for a particular page, the SET TAG ARRAY signal on line 350 is applied to first inputs of AND gates 352 and 354, respectively. When the WRITE bit=1 signal on line 356, which is applied to the second input of AND gate 352, is at a ONE, the MAKE WRITE FLAG=1 signal on line 358 is applied to the tag array. When the SHARE bit=1 signal on line 360, which is applied to the second input of AND gate 354, is at a ONE, the MAKE SHARE FLAG=1 signal on line 362 from the gate 354 is a ONE and is applied to the tag array. The particular bit setting is in the general purpose register addressed by the instruction, (assuming IBM/370 architecture). These bits are gated to the tag array, along with the SET TAG ARRAY signal and MEMORY PAGE ADDRESS signal by the processor, as set forth relative to FIG. 9. The tag array is read out using the page address and the write and share flags are written per the setting of the write bit and share bit lines from the general purpose registers.

Whenever a page of information is gated from main memory to a processor's private L2 cache, the GATE REQ. PAGE TO P-L2 CACHE signal on line 364 is applied to first input of AND gates 366, 368 and 370, and a ONE will be written into the tag array for that page and processor. For example, when the CPU1-L2 MISS signal on line 372 is a ONE, output line 374 from gate 366, MAKE CPU1=1 signal is a ONE which is applied to the tag array. When the CPU2-L2 MISS signal on line 376 which is applied to the second input of AND gate 368 is a ONE, the output line 378 thereof is a ONE, and the MAKE CPU2=1 signal is applied to the tag array. When the CPU6-L2 MISS signal on line 380 is a ONE, which is applied to the second input of AND gate 370, the output thereof on line 382 is a ONE and the MAKE CPU6=1 signal is applied to the tag array.

Figure 16:
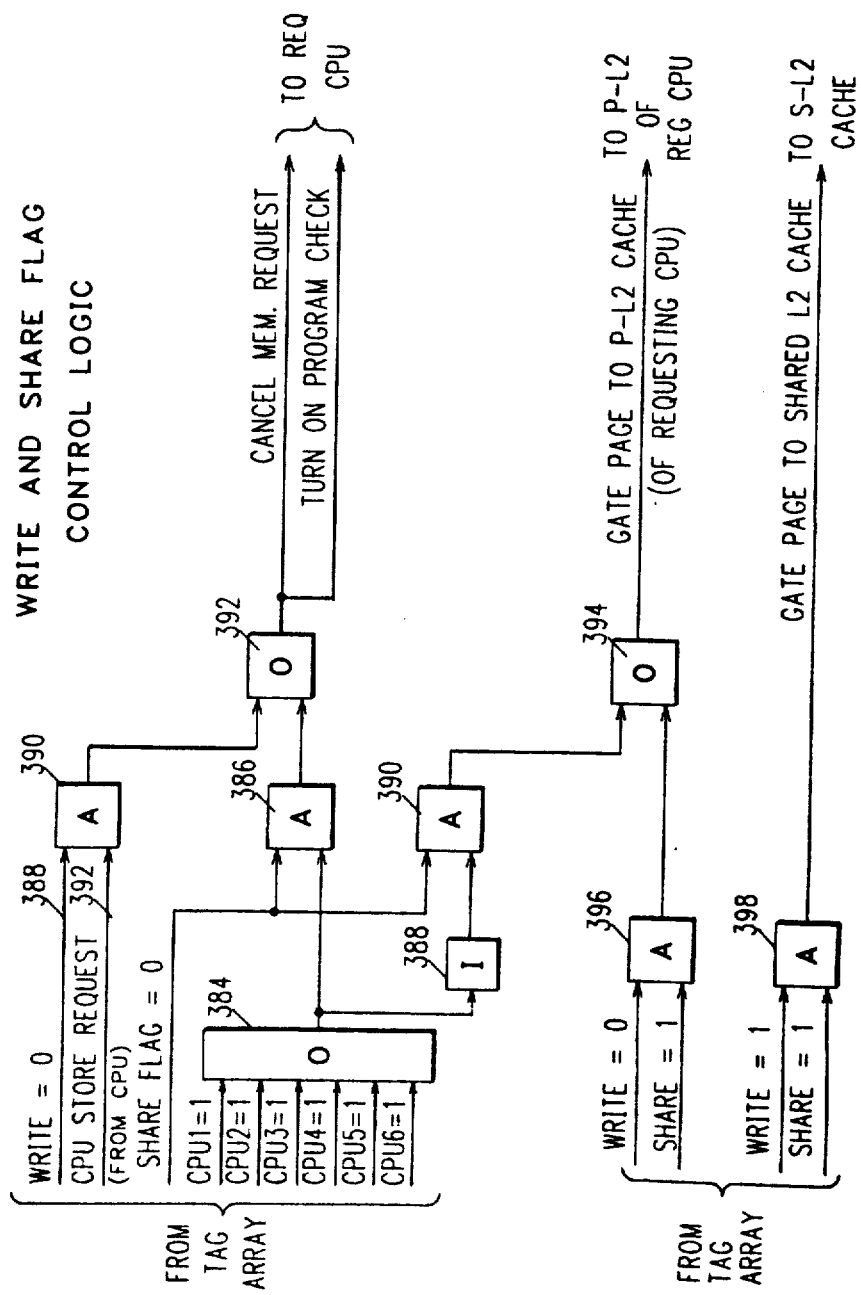
FIG. 16 is a block diagram representation of the write and share flag control logic in the multiprocessing system according to the present invention.

FIG. 16 illustrates the WRITE and SHARE flag control logic. The CPU1=1 through CPU6=1 signals generated in FIG. 15 are applied to the respective inputs of an OR gate 384, with the output from this OR gate being applied to the first input of an AND gate 386 and the input of an inverter 388, with the output thereof being applied to the first input of an AND gate 390. A SHARE FLAG=0 signal is applied to the second input of the AND gates 386 and 390 respectively. A WRITE=0 signal is applied on line 388 to the first input of an AND gate 390, which has a CPU STORE REQUEST signal applied on line 392 to the second input thereof. The output lines of AND gates 386 and 390 are applied to first and second inputs respectively of an OR gate 392. The output line of AND gate 390 is applied to the first input of an OR gate 394. An AND gate 396 has a WRITE=0 signal applied to the first input thereof, and a SHARE=1 signal applied to the second input thereof, with the output line of gate 396 being applied to the second input of the AND gate 394. An AND gate 398 has a WRITE=1 signal applied to the first input thereof, and a SHARE=1 signal applied to the second input thereof. If the SHARE FLAG=0 signal applied to the first inputs of AND gates 386 and 390 is a ONE, and the output of OR gate 384 is a ONE, OR gate 392 provides a CANCEL MEM. REQUEST signal and a TURN ON PROGRAMS CHECK signal to the requesting CPU thereby preventing another copy from being sent to other processors. Also, if the AND gate 390 is providing the binary ONE output signal the memory request is cancelled and the program check is turned on.

If the SHARE flag is ZERO, and no CPU contains this page in its private caches, which is indicated by the inverter 388 providing a ONE output, the AND gate 390 provides a ONE input to the OR gate 394 and a GATE PAGE to P-L2 CACHE signal (of requesting CPU) is sent to the private L2 cache of the requesting processor. The same sequence of events occurs if the SHARE flag equals ONE and the WRITE flag equals ZERO which causes the AND gate 396 to provide a ONE input to the second input of the OR gate 394.

The only time a page is sent to the shared L2 cache is when both the WRITE flag and the SHARE flag are equal to ONE, which causes the AND gate 398 to provide the GATE PAGE TO SHARED L2 CACHE signal to the shared L2 cache of the requesting processor.

The cache organization utilizing flags, as just described, is superior to a L2 cache common to all processors and cross-interrogating the private L1 caches with cast out required for changed lines. However, there may be applications where the software does not have sufficient knowledge about the use of pages to mark them appropriately. In these instances, the software is forced into marking these pages as both writable and sharable. Consequently, there may be applications where a large percentage of pages and lines are moved to the shared cache. Also, for pages that are subject to both sharing and writing, there may be relatively long periods of time when both do not occur together. During this time it would be better if these pages were in private caches. For situations as set forth above, an alternative implementation is defined below, which moves all pages and lines to the private L2 and L1 caches and dynamically adjusts to the sharing and writing of pages/lines which are marked both writable and sharable (1,1).

FIG. 17 illustrates a multiprocessing system 400, which has operands and instructions contained in the shared main storage 402 at L3. Main storage 402 exchanges the instructions and operands with a plurality of processor groups via a system control element 404. An input/output bus 406 connects the system control element 404 to a plurality of peripheral devices such as direct access storage devices (DASD's). The system control element 404 is also connected to a first processor group comprised of processors A and B via the L2 and L1 private and L1 shared cache configuration which will be described in more detail shortly. Note that there is no shared L2 cache. The system control element 404 is connected to other like processing groups via a bus 408. Each of the respective processor groups may include more than two processors, however, only two such processors are shown for simplicity of explanation.

Each processor communicates directly for information exchanger purposes, with the private cache and a shared cache at L1, which is shared by each processor in the multiprocessing group. Lines of information are stored in each of the caches at L1, whereas the private caches at L2 contain pages of information. Processor A communicates with its private cache 410 and a shared cache 412 at L1, with data exchange between processor A and the caches being via lines 414 and 416, respectively. If the line of information requested is not resident in either of the caches 410 or 412 at L1, the private cache 418 is interrogated via lines 420 from the private cache 410, to see if the page of information which contains the requested line is resident therein. If the page of information is resident therein, the requested line of information is transferred to either the L1 caches 410 or 412. If on the other hand, the page of information is not resident at the private cache at L2, the system control element 404 is signalled to request transfer of the page of information from main memory at L3 to the private L2 cache 418. All pages regardless of the setting of the WRITE and SHARE flags are moved from main memory 402 to the private L2 cache 418. When a page is moved from main memory to the private L2 cache, the associated WRITE and SHARE flags are moved from the tag array to the private L2 directory. Also, as each line from the page is transferred to the private L1 cache, the two flag bits are stored in the L1 directory along with the line address. It is at L1 that the WRITE and SHARE flags modify the hierarchy control as is set forth below. The requested line of information, when once transferred to the private L2 cache 418 is then transferred to the shared cache at L1, 412 if the WRITE and SHARE flags are both ONE. In all other instances the requested line of information is transferred to the private L1 cache 410.

Processor B exchanges data with its private cache 424 at L1 and shared cache 412 at L1 via lines 426 and 428, respectively. If a requested line of information is not resident in either the shared cache 412 or the private cache 424, the page of information containing the requested line is requested from processor B's private cache 430 at L2 via line 432. If the requested page of information is not resident in the private cache 430, the main memory 402 at L3 is signalled via the system control element 404 to transfer the requested page of information to the private cache 430 at L2, with the requested line of information therein being transferred to either the shared cache 412 or private cache 424 at L1 as determined by the WRITE and SHARE flags as set forth relative to the description for processor A.

FIG. 18 is a more detailed block diagram representation of the multiprocessing system 400 which illustrates the control and directory associated with the shared cache at L1 and each of the private caches at L1 and L2. The cache control and directory 434 for private L1 cache 410 is connected to processor A via line 436 and to cache control and directory 438 for private L2 cache 418 via line 440 and then to the storage control element 404 via line 442. Processor A is connected to the cache control and directory 444 for shared L1 cache 412 via line 446 and to cache control and directory 438 of private L2 cache 418 via line 448.

Processor B is connected to cache control and directory 450 for private L1 cache 424 via line 452 and to cache control and directory 444 for shared L1 cache 412 via line 454.

Cache control and directory 444 is connected to cache control and directory 456 for private L2 cache 430 via line 458 and then to storage control element 404 via line 460. The cache control and directory elements respond to the respective READ and WRITE commands to determine if the requested line or page of information is resident in the respective caches, or whether or not the page of information must be fetched from the main memory.

All pages, regardless of the setting of the WRITE and SHARE flags are moved from memory to the private L2 caches. When a page is moved from main memory to the private L2 cache, the associated WRITE and SHARED flags are moved from the tag array to the L2 directory. Also, as each line from the page is transferred to the private L1 cache, the two flag bits are stored in the L1 directory along with the line address. It is at L1 that the WRITE and SHARE flags modify the hierarchy control as set forth below.

Obviously, a line whose page WRITE bit is ZERO cannot be written into and no cross-interrogate is required. The SHARE flag has no impact at L1 for read only lines (WRITE flag equals ZERO). For lines marked writable (WRITE flag equal ONE) the SHARE flag alters the operation at L1 substantially as follows. If a store is requested for a line marked write but not sharable (1,0) the store takes place to the private L1 cache and no cross-interrogate is required because only one copy of the line can exist at L1 and L2. If the line is marked (1,1) then before the store can take place, the line is moved (cast out) to the shared L1 cache and a cross-interrogate of the other private L1 cache is accomplished. If the line is in the other processor's cache it is invalidated.

If a (1,1) line is in the shared L1 cache both processors can fetch and store from it. Therefore, if a page is in one private L2 cache and the other processor has a MISS from a line in that page, it must be for a line that the other processor has not stored into. Therefore, line MISSES that reach L2 are for lines that have not been changed by the other processor.

Consequently, a copy of a (1,1) page can reside in each private L2 cache and copies of unchanged lines of that page can reside in each L1 cache. As soon as a processor changes a line, it first moves the line to the shared cache and invalidates the line if present in the other processors' private cache causing subsequent use of this line to be from the shared cache rather than the private cache. Essentially, the lines are handled as shared read only until an actual store takes place.

Changed (1,0) lines (writable but not sharable) reside only in one private L1 cache and are eventually LRU cast out from the private L1 cache to its private L2 cache. Changed (1,1) lines reside only in shared L1 cache and are cast out to one or both L2 caches depending on whether the page is resident in the L2 cache.

FIG. 19 is a logic flowchart for a processor memory "fetch request". In response to a "fetch request" from a given processor, the processor transmits a "fetch request" via line 462 to logic blocks 464 and 466 respectively, to determine if the requested line of information is resident in either the priviate L1 cache of the requesting processor or in the shared L1 cache. At logic block 464 the question is asked, "Is there a line hit in the private L1 cache?". If the answer is yes, the line is fetched from the private L1 cache of the requesting processor as indicated at logic block 468, and the line is transferred to the requesting processor with an end of memory fetch request then taking place as indicated at 470. If there is, on the other hand, no line hit in the private L1 cache as indicated at 464, the process proceeds to logic block 472 pending the outcome of the logic process at logic block 466. At logic block 466 the question is asked, "Is there a line hit in the shared L1 cache?". If the answer is yes, the line is fetched from the shared L1 cache as indicated at logic block 474, and the line is transferred from the shared L1 cache to the requesting processor with an end of memory fetch request occurring as indicated at 470. If, on the other hand, the answer is no, the logic process proceeds from logic block 466 to logic block 472.

If the answer to the logical question asked in logic blocks 464 and 466 are both no, indicating that the requested line is not resident at L1, the logic process proceeds from logic block 472 to logic block 476 to determine if the page of information containing the requested line is stored at L2. At logic block 476, the question is asked, "Is there a line hit in the private L2 cache?". If the answer is yes, the logical process proceeds to logic block 478 which is indicative of moving the requested line of information from the private L2 cache to the private L1 cache, with the logic process than proceeding to logic block 468, with the logic process then proceeding as previously explained.

If the answer is no, the logic process then proceeds to logic block 480 to access the main memory and the tag array in the system control element. The logic process then proceeds to logic block 482 where the question is asked, "Is the SHARE flag equal to ONE?". If the answer is yes, the logic process proceeds to logic block 484 and if the answer is no the logic process proceeds to logic block 486.

If the answer to the question asked in logic block 482 is yes, the page is moved from main memory to the private L2 cache and the CPU bit is turned on as indicated at 484, with the logical process then proceeding to logic block 478 with the logic process then proceeding as previously set forth. If the answer at logic block 482 was no, the logic process proceeds to logic block 486 where the question is asked, "Is any CPU bit equal to ONE?". If the answer is yes, the logic process proceeds to logic block 488 to signal a program check. If the answer is no, the logic process proceeds to logic block 484, with the logic process then continuing as previously set forth.

FIGS. 20.1 and 20.2 set forth the processor memory "store request" logic flowchart. In response to a given processor's memory "store request" as indicated at line 490, the logic process proceeds to logic blocks 492 and 494 to determine if the target line is resident in either the private L1 or the shared L1 cache, respectively. At logic block 492, the question is asked, "Is the target line resident in the private L1 cache?". If the answer to this question is yes, the logic process proceeds to logic block 496 and if the answer is no the logic process proceeds to logic block 498 to await the logic decision at logic block 494.

If there is a directory compare at the shared L1 cache, that is the answer to the question asked at logic block 492 is yes, the store takes place in the shared L1 cache as indicated at logic block 496 and the process proceeds to 500 which indicates the end of store. No test of the WRITE and SHARE flags is required because only lines that are both writable and sharable (1,1) can reside in the shared L1 cache. Therefore, the shared cache directory does not contain any WRITE or SHARE flags. Also, no change flag is required because all lines in the shared cache are changed.

In response to the memory "store request" the question is asked at logic block 494, "Is the target line resident in the private L1 cache?". If the answer is yes, the logic process proceeds to logic block 502 and if the answer is no, the logic process proceeds to logic block 498. If there is a directory compare at the private L1 cache, the WRITE and SHARE flags must be tested. If the WRITE equals ONE, and the SHARE equals ZERO, then the store takes place at the private L1 shared cache. This is accomplished, at logic block 502 where the question is asked, "Is WR equal ONE and SH equal ZERO?". If the answer is yes, the logic process proceeds to logic block 504 and if the answer is no, the logic process proceeds to logic block 506. If the answer is yes, the target line is in the private L1 cache as indicated at logic block 504, and the logic process proceeds to an end of store as indicated at 500. If, on the other hand, the answer at logic block 502 is no, the question is asked in logic block 506, "Is WR equal ZERO?". If the answer is yes, the logic process proceeds to logic block 508 and if the answer if no, the logic process proceeds to logic block 510. If the write equal ZERO, the store does not take place but instead a "program check" is signaled to the processor as indicated at logic block 508, with an end of store request then taking place as indicated at 512. If neither of the above two conditions exist, then both the WRITE and SHARE flags must be ONE, therefore, the target line is transferred from the private L1 cache to the shared L1 cache as indicated at logic block 510 after which the logic process proceeds to logic block 514 which is indicative of the line being invalidated in the remote private L1 cache, with the logic process then proceeding to logic block 496 which is indicative of a store taking place in the shared L1 cache. Remote private L1 caches are cross-interrogated (XI) and invalidated if in a remote private L1 cache.

If the target line is not resident in either the shared L1 cache or the private L1 cache, which is indicated by the answer to the logical questions asked in blocks 492 and 494 being no, the logic process then proceeds to logic block 498 and thence to logic block 516 where the question is asked, "Is the target line resident in the private L2 cache?". If the answer is yes, the logic process proceeds to logic block 518 and if the answer is no the logic process proceeds to logic block 520. If there is a private L2 cache directory compare, which is indicated by a yes in response to the question asked at logic block 516, then the WRITE and SHARE flags must be checked to determine if the lines should be moved to the private L1 cache or the shared L1 cache. The question is asked in logic block 518, "Is WR equal to ONE, and SH equal to ZERO?" If the answer is yes the logic process proceeds to logic block 522 and if the answer is no the logic process proceeds to logic block 524. If the answer to the question in logic block 518 is yes, the question is then asked in logic block 522, "Is any CPU bit equal ONE?". If the answer is yes, the logic process proceeds to logic block 508 and a signal program check is generated and an end of store request is indicated at 512. If the answer is no, the logic process proceeds to move the requested page of information from main memory to the private L2 cache and the CPU bit is turned on as indicated at logic block 526. The target line is then moved from the private L2 cache to the private L1 cache as indicated at logic block 528, with a store then taking place in the private L1 cache as indicated at logic block 504 with an end of store then taking place as indicated at 500.

If the WRITE equals ZERO as indicated at logic block 524, the logic process proceeds to logic block 508 to signal a program check and an end of store request as indicated at 512. If the answer is no, the logic process proceeds to logic block 530 to move the target line from the private L2 cache to the shared L1 cache, with a store in the shared L1 cache then taking place as indicated at 496 with an end of store being indicated at 500. If the target line was not present in the private L2 cache as indicated by a no to the question asked in logic block 516, the logic process proceeded to logic block 520 which is indicative of an access of the main memory and tag array, with the logic process then proceeding therefrom to logic block 518 and on through the logic process as previously set forth.

FIG. 21 sets forth the implementation of the memory request logic for a private L1 cache. If there is a P-L1 HIT signal on line 498 and a FETCH REQUEST signal from the processor on line 500 to the inputs of AND gate 502 then OR gate 504 becomes active to provide the FETCH from P-L1 signal to the private L1 cache.

AND circuit 506 becomes active when there is coincidence of a FETCH REQUEST signal on first input line 508 and a TRANSFER FROM P-L2 to P-L1 COMPLETE signal on line 510 which activates the OR gate 504 to once again provide the FETCH FROM P-L1 CACHE signal to the private L1 cache.

In response to the coincidence of a STORE REQUEST signal on line 512 and a P-L1 HIT signal on line 514, AND gate 516 becomes active and first inputs 518, 520 and 522 of AND gates 514, 526 and 528 respectively are primed in order to test the condition of the WRITE and SHARE flags associated with the target line. If WR=1 and SH=0 on the remaining two inputs of AND gate 524, the output thereof becomes active and OR gate 530 provides the STORE IN P-L1 CACHE signal to the private L1 cache on output line 532. If WR=0 AND gate 526, becomes active and a program check signal is provided on output line 534 thereof to the CPU. If the WR=1 and SH=1 signals applied to the remaining two inputs of AND gate 528 are active, AND 528 provides at the output line 536 thereof the TRANSFER LINE FROM P-L1 to S-L1 signal to the private L1 cache and the shared L1 cache, and the INVALIDATE REMOVE P-L1 CACHE signal on line 538 to the system control element. The AND gate 540 becomes active in response to the coincidence of the TRANSFER FROM P-L2 to P-L1 COMPLETE signal on line 510 and the STORE REQUEST signal on 512 causing the OR gate 530 to provide the STORE IN P-L1 CACHE signal on line 532 which causes the target line to be fetched from the private L2 cache to the private L1 cache.

Each cache has a line counter which is reset to ZERO at the start of a line transfer and generates a LINE TRANSFER COMPLETE signal when the proper number of words have been transferred to or from the cache.

FIG. 22 is a block diagram representation of the memory request logic for the shared L1 cache. An AND gate 542 is active in response to the coincidence of the S-L1 HIT signal on input line 544 and the FETCH REQUEST on line 546 which in turn activates the OR gate 548 for providing the FETCH FROM S-L1 cache signal on output line 555 thereof to the shared L1 cache. AND gate 552 is active in response to the coincidence of the FETCH REQUEST signal on line 546 at the first input thereof and the TRANSFER from P-L2 to L1 COMPLETE signal on line 554 which is applied to the second input thereof which in turn activates the OR gate 548 to provide the FETCH from S-L1 CACHE signal on line 550 to the shared L1 cache.

An AND gate 556 is active in response to the coincidence of the TRANSFER FROM P-L1 to S-L1 COMPLETE signal on line 558 applied to the first input thereof, a INVALIDATION OF REMOTE P-L1 COMPLETE signal on line 556 which is applied to the second input thereof and the STORE REQUEST signal on line 562 which is applied to the third input thereof. The active state of gate 556 activates OR gate 564 to provide an STORE IN S-L1 cache signal on output line 566 thereof to the shared L1 cache. An AND gate 568 is active in response to the coincidence of the STORE REQUEST signal on line 562 which is applied to the first input thereof and the S-L1 HIT signal on line 570 which is applied to the second input thereof, which in turn activates OR gate 564 for providing the STORE IN S-L1 CACHE signal on output line 566 thereof to the shared L1 cache.

OR gates 572 and 574 and AND gate 576 comprise the "cast out" logic for the shared L1 cache. All lines in the shared L1 cache are changed, therefore, when a new line is to be transferred into the shared L1 cache, the replaced line must be read out of the shared L1 cache and moved to one or more of the private L2 caches. The reading of the old line into the shared L1 cache line buffer and then transferring it to a L2 cache is referred to as a line cast out operation. The line to be cast out is determined by the shared cache LRU replacement logic.

If a line is to be transferred into the shared L1 cache, one of the input lines 578 or 580 will be active signaling that the line that is to be replaced should be read out of the shared cache into its output line buffer. The signal on line 578 is the TRF. LINE FROM P-L1 to S-L1 COMPLETE signal and the signal on line 580 is the TRANSFER LINE FROM P-L2 to S-L1 COMPLETE signal. In response to either of these lines being active, OR gate 572 becomes active causing the first input to AND gate 576 becomes active. OR gate 574 becomes active in response to either TRF. LINE FROM P-L1 to S-L1 signal on line 582 being active to TRF. LINE P-L2 to S-L1 signal on line 584 being active which causes the OR gate 574 to provide on output line 586 thereof the READ line from S-L1 cache to S-L1 OUTPUT LINE BUFFER signal which is provided to shared L1 cache. This signal is also provided to the second input of AND gate 576 which in response to the coincidence of an active output signal from OR gate 572 provides on output line 588 thereof a CAST OUT REQUEST to P-L2 cache signal which is provided to the private L2 cache. To reiterate the sequence of operation just described, the target line is read out of the L2 cache into its output line buffer at the same time the line to be replaced in the shared L1 cache is read out thereof into its output buffer. Then the target line is transferred to the shared L1 input buffer. When the shared L1 input buffer is full it generates the TRANSFER LINE FROM P-L2 to S-L1 COMPLETE signal. At this point the shared L1 cache sends out a cast out request to all the private L2 caches. While this line is being transferred to the private L2 cache the processor can then access the shared L1 cache.

FIGS. 23.1 and 23.2 when viewed with 23.1 on the top, comprises the memory request logic for a private L2 cache. No testing of the WRITE or SHARE flags are required at L2 on a FETCH request. On a STORE request, these two flags play a key role as follows. AND gate 590 is active in response to the coincidence of the P-L1 DIR. NON-COMP. (MISS) signal on line 592 to the first input thereof and a S-L1 DIR. NON-COMP. (MISS) signal on line 594 to the second input thereof which primes the first inputs of AND gates 596 and 598. The second input to the AND gate 598 is the FETCH REQUEST signal on line 600 which makes AND gate 598 active for providing the FETCH REQUEST TO P-L2 CACHE signal on line 602 to the private L2 cache, and which signal is provided via line 604 to the first inputs of AND gate 606 and 608 to prime these gates. The P-L2 DIR. COMP. (HIT) signal on line 610 is provided to the second input of AND 606 making this gate active and providing an active input signal to the first input of OR gate 610, with the TRANSFER LINE FROM P-L2 to P-L1 signal being provided on output line 612 thereof to the private L2 and the private L1 caches. A P-L2 DIR. NON-COMP. (MISS) signal on line 614 is provided to the second input of AND gate 608 for activating this gate and in turn activating OR gate 616 to provide a FETCH REQUEST TO MEM. signal on output line 618 thereof to the system control element. The active output signal from AND gate 608 is also provided to a first input of an AND gate 620 which has a MEM. TO P-L1 PAGE TRANSFER COMPLETE signal on line 622 applied to a second input thereof making this gate active, with the active signal being provided to the second input of OR gate 610 for providing an output signal on line 612 as previously described.

A STORE REQUEST signal on line 624 is provided to the second input of AND gate 596 for making this gate active, with a STORE REQUEST TO P-L2 CACHE signal being provided on output line 626 thereof to the private L2 cache, with this signal also being provided via line 628 to first inputs of AND gates 630 and 632, respectively. The output of AND gate 596 signals a STORE REQUEST for a line which is not in either the private L1 cache or the shared L1 cache. If the target line is in the private L2 cache, the P-L2 DIR. COMPARE signal on line 634 is active causing the AND gate 630 and OR gate 636 to be active, with the output of OR gate 636 being applied to first inputs of AND gates 638, 640 and 642 for priming these gates. The gates 638, 640 and 642 are utilized to test the state of the WRITE and SHARE flags.

If WR=1 and SH=0 at the remaining two inputs of AND gate 638, this gate becomes active and provides an active signal on output line 644 thereof to the third input of OR gate 610 for providing an active signal at output line 612 as previously set forth. If WR=0 at the second input of AND gate 640, this gate becomes active and a PROGRAM CHECK signal is provided on output line 646 thereof to the processor. If WR=1 and SH=1 at the remaining two inputs of AND gate 642 this gate becomes active and the TRANSFER LINE FROM P-L2 AND S-L1 signal is provided on output line 648 thereof to the private L2 cache and the shared L1 cache.

If the target line is not resident in the private L2 cache, the P-L2 DIR. NON-COMP. signal on line 650 is applied to the second input of AND gate 632 making this gate active, with the active state thereof being provided on output line 652 to the second input of OR gate 616 for providing the FETCH REQUEST TO MEMORY signal on output line 618 thereof. The active output from AND gate 632 is also provided to a first input of an AND gate 654, which has a MEM. TO P-L2 PAGE TRANSFER COMPLETE signal on line 656 applied to the second input thereof with the active state of 654 being applied to the second input of OR gate 636 for activating this gate, with the active state of gate 636 being utilized to test the state of the WRITE and SHARE flags at the inputs of AND gates 638, 640 and 642 as previously set forth.

It is seen from the above, that a fetch request to the private L2 cache always results in the line being transferred back to the private L1 cache. However, a store request to the private L2 cache must always test the WRITE and SHARE flags to determine if the store is allowed and whether the line should be transferred to the private L1 cache or to the shared L1 cache.

In summary, a multiprocessing system including a three level memory hierarchy is set forth in which the states of the WRITE and SHARE flags determine where a target page from main memory will be located in either the private or shared caches of the first and second memory levels.

INDUSTRIAL APPLICABILITY

It is an object of the invention to provide an improved multiprocessing system.

It is another object of the invention to provide an improved multiprocessing, multilevel memory hierarchy.

It is yet another object of the invention to provide an improved multiprocessing three level memory hierarchy having a WRITE flag and a SHARE flag per page of information stored in the memory hierarchy, with the flags being utilized to communicate from a common main memory at memory level three to private and shared caches at memory levels one and two how the associated page of information is to be utilized.

Having thus described our invention, what we claim as new, and desire to secure by Letters Patent is:

1. A method of operating a multiprocessor system comprised of at least first and second processors, a system control element and a three level memory hierarchy, including a main memory at memory level three, connected to said system control element, in which pages of information are stored at addressable locations, with each page of information being comprised of lines of information, including WRITE and SHARE flags which may be in one of two binary states, with the state of the WRITE flag determining if a page of information is writeable or read only by a processor, and the state of the SHARE flag determining if a page of information is shareable or non-shareable by all processors, with each flag being set in a predetermined state, at least first and second private caches at memory level two, connected to said systems control element, which are exclusively operative with said at least first and second processors, respectively, memory, at least third and fourth private caches at memory level one which are exclusively operative with said first and second processors, respectively, and are connected to said first and second private caches, respectively, and first and second shared caches at memory levels one and two, respectively, which are connected together, with the first shared cache being connected to said first and second processors and the second shared cache being connected to said system control element, with pages of information being stored in the caches at memory level two, and lines of information being stored in the caches at memory level one, with said information being accessed with respect to said addressable locations in said main memory, said method comprising the steps of:

interrogating by a given processor, to access a selected line of a given page of information, the private and shared caches at memory level one, and if said line is stored therein, accessing same, and if not;

interrogating by said given processor the private and shared caches at memory level two, and if said given page of information is stored therein, transferring said selected line from said given page from the cache at level two in which the selected line is stored, to the cache at level one which is connected thereto and accessing same, and if not;

interrogating by said given processor said main memory at memory level three via said system control element, with said system control element examining the state of said WRITE and SHARE flags of said given page of information, with said page of information being transferred to said shared cache at memory level two when said WRITE and SHARE flags are each in a given predetermined state indicative of said given page of information being both writeable and shareable, and being transferred to the private cache at memory level two, which is exclusively operative with said given processor, when at least one of said WRITE and SHARE flags are not in said predetermined state, which is indicative of said given page of information not being both writeable and shareable; and transferring said selected line from said given page from the cache at level two in which the selected line is stored, to the cache at level one which is connected thereto for access by said given processor.

2. The method of claim 1, wherein the first binary state of said WRITE and SHARE flags is a binary ONE state.

3. In a multiprocessor system, including a three level memory hierarchy, the combination comprising:

at least first and second processors which are operative with said memory hierarchy;

a main memory at memory level three, in which a plurality of sets of information, with each set of information being comprised of subsets of said information, are stored at addressable locations, with each set of information including a WRITE flag and a SHARE flag, with the state of the WRITE flag determining if the set of information is writeable or read only by a processor, and the state of the SHARE flag determining if each set of information is shareable or non-shareable by all processors, with each flag being established in a predetermined state;

at least first and second private caches at memory level two connected to said main memory, and which are operative exclusively with said at least first and second processors respectively, in which a given number of sets of information previously transferred from main memory are stored;

a first shared cache at memory level two connected to said main memory, which is operative with each of said at least first and second processors, in which a given number of sets of information previously transferred from main memory are stored;

at least third and fourth private caches at memory level one, which are connected to and operative with said at least first and second private caches, respectively, and exclusively with said at least first and second processors, respectively, in which a given number of said subsets of said sets of information previously transferred from said at least first and second private caches, respectively are stored;

a second shared cache at memory level one, which is connected to and operative with said first shared cache and each of said at least first and second processors, in which a given number of said subsets of said sets of information previously transferred from said first shared cache are stored; and a system control element which is connected to and operative with said main memory at memory level three and said at least first and second private caches and said first shared cache at memory level two, and which is operative in response to a given processor interrogating its associated private caches and shared caches at memory levels one and two to access a subset of a selected set of information which is found to be not stored therein, with said system control element checking the state of said WRITE and SHARE flags of said selected set of information in said main memory, for transferring said selected set of information to said first shared cache at memory level two when said WRITE and SHARE flags are each in a given predetermined state indicative of said selected set of information being both writeable and shareable, and for transferring said selected set of information to one of said first and second private caches at memory level two when at least one of said WRITE and SHARE flags are not in said given predetermined state, which is indicative of said selected set of information not being both writeable and shareable.

4. The combination claimed in claim 3, wherein said sets of information stored in said main memory and said at least first and second private caches and said first shared cache at memory level two comprise pages of information, with there being a WRITE flag and a SHARE flag per page.

5. The combination claimed in claim 4, wherein said subsets of information stored in said at least third and fourth private caches and said second shared cache at memory level one comprise lines of information.

6. The combination claimed in claim 5, wherein the predetermined state of said WRITE and SHARE flags each comprise a first binary state.

7. The combination claimed in claim 6, wherein said first binary state comprises a binary ONE state.

8. In a multiprocessor system, including a three level memory hierarchy, the combination comprising:

n processors, where n is an integer $\geq 2$;

a main memory at memory level three, in which pages of information, each page comprised of a plurality of lines, are stored at addressable locations, with each page including a WRITE flag and a SHARE flag, with the state of the WRITE flag determining if each line in the page is writeable or read only by a processor, and the state of the SHARE flag determining if each line in the page is shareable or non-shareable by all processors, with each flag being set in a predetermined state;

a first shared cache at memory level two, which is operative with each of said n processors, including means for transferring a page of information from main memory to said first shared cache when the WRITE and SHARE flags are each in a given predetermined state, indicative of said page of information being both writeable and shareable;

a first set of n private caches at memory level two, with the first and second processors being exclusively operative with the first and second private caches, respectively, and the nth private cache being exclusively operative with the nth private cache, including means for transferring a page of information to one of said n private caches from main memory when at least one of the WRITE and SHARE flags are not in said given predetermined state, indicative of a page not being both writeable and shareable;

a second shared cache at memory level one, which is operative with each of said n processors, including means for transferring lines of information from said first shared cache to said second shared cache; and a second set of n private caches at memory level one, with the first and second processors being exclusively operative with the first and second private caches, respectively, and the nth private cache being exclusively operative with the nth private cache, including means for transferring lines of information from the first set of n private caches to the second set of n private caches.

9. In a multiprocessor system, including a three level memory hierarchy, the combination comprising:
   at least first and second processors;
   a main memory at memory level three, in which sets of information, each set comprised of a plurality of subsets, are stored at addressable locations, with each set including a WRITE flag and a SHARE flag, with the state of the WRITE flag determining if each subset in a set is writeable or read only by a processor, and the state of the SHARE flag determining if each subset in the set is shareable or non-shareable by all processors, with each flag being established in a predetermined state;
   a first shared cache at memory level two, which is operative with each of said first and second processors, including means for transferring a set of information from main memory to said first shared cache when the WRITE and SHARE flags are each in a given predetermined state indicative of said set of information being both writeable and shareable, and a subset in said set being requested by one of said first and second processors;
   at least first and second private caches at memory level two, which are exclusively operative with said first and second processors, respectively, including means for transferring a set of information to one of said first and second private caches from main memory when at least one of the WRITE and SHARE flags are not in said given predetermined state, indicative of a set not being both writeable and shareable, and a subset in said set of information being requested by said first or second processor;
   a second shared cache at memory level one, which is operative with each of said first and second processors, including means for transferring subsets of information from said first shared cache to said second shared cache when requested by either of said first and second processors; and
   at least third and fourth private caches at memory level one, which are exclusively operative with said first and second processors, respectively, including means for transferring subsets of information from said first and second private caches, to said third and fourth private caches, respectively, when requested by said first or second processors, respectively.

10. In a multiprocessor system, including a three level memory hierarchy, the combination comprising:
    at least first and second processors;
    a main memory at memory level three, in which sets of information, each set comprised of a plurality of subsets, are stored at addressable locations, with each set including a WRITE flag and a SHARE flag, with the state of the WRITE flag determining if each subset in the set is writeable or read only by a processor, and the state of the SHARE flag determining if each subset in the set is shareable or non-shareable by all processors, with each flag being established in a predetermined state;
    at least first and second private caches at memory level two, which are operative with each of said first and second processors, including means for transferring a set of information to said first private cache when requested by said first processor and transferring a set of information to said second private cache when requested by said second processor from main memory for all combinations of states of the WRITE and SHARE flags;
    a shared cache at memory level one, which is operative with each of said first and second processors, including means for transferring a subset of information to said shared cache from either of said first and second private caches when the WRITE and SHARE flags, for the set in which the subset resides, are each in a given predetermined state indicative of said set of information being both writeable and shareable, when requested by either of said first and second processors; and
    at least third and fourth private caches at memory level one, which are exclusively operative with said first and second processors, respectively, including means for transferring a subset of information, to said third private cache from said first private cache when requested by said first processor, or to said fourth private cache from said second private cache when requested by said second processor when at least one of the WRITE and SHARE flags, for the set in which the subset resides, is not in said given predetermined state indicative of said set of information not being both writeable and shareable.

* * * * *